(12) United States Patent
Shieh

(10) Patent No.: US 10,994,620 B2
(45) Date of Patent: May 4, 2021

(54) ELECTRIC BICYCLE AND BATTERY LIFT MECHANISM AND BATTERY CARRYING DEVICE THEREOF

(71) Applicants: DARFON ELECTRONICS (SUZHOU) CO., LTD., Suzhou (CN); DARFON ELECTRONICS CORP., Taoyuan (TW)

(72) Inventor: Yu-Chang Shieh, Taoyuan (TW)

(73) Assignees: DARFON ELECTRONICS (SUZHOU) CO., LTD., Suzhou (CN); DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 16/508,793

(22) Filed: Jul. 11, 2019

(65) Prior Publication Data

US 2019/0329660 A1 Oct. 31, 2019

Related U.S. Application Data

(63) Continuation of application No. 15/726,300, filed on Oct. 5, 2017, now Pat. No. 10,351,013, which is a (Continued)

(30) Foreign Application Priority Data

Dec. 18, 2015 (TW) .................................. 104142814
Sep. 10, 2016 (TW) .................................. 105129503

(51) Int. Cl.
*B60L 50/64* (2019.01)
*B62K 19/40* (2006.01)
(Continued)

(52) U.S. Cl.
CPC .............. *B60L 50/64* (2019.02); *B62K 19/40* (2013.01); *B62K 25/286* (2013.01); *B62K 25/30* (2013.01);
(Continued)

(58) Field of Classification Search
CPC ....... B60L 50/64; B60L 2200/12; B62K 3/04; B62K 19/40; B62K 25/286; B62K 25/30;
(Continued)

(56) References Cited

U.S. PATENT DOCUMENTS 7,117,966 B2 * 10/2006 Kohda ..................... B60K 1/04
180/68.5
8,473,130 B2 * 6/2013 Brady ..................... B60L 53/80
701/22

FOREIGN PATENT DOCUMENTS

CN 101695900 B 7/2012
EP 2581296 A1 4/2013

* cited by examiner

*Primary Examiner* — Minnah L Seoh
*Assistant Examiner* — Felicia L. Brittman
(74) *Attorney, Agent, or Firm* — Innovation Capital Law Group, LLP; Vic Lin

(57) ABSTRACT

An electric bicycle and a battery lift mechanism and a battery carrying device thereof are disclosed. The battery lift mechanism includes a bracket, a carrier for carrying a battery, an upward-force device coupling with the carrier, and a locking device selectively in an unlocked state or a locked state. The carrier is movable relative to the bracket along an up-down path; the upward-force device is capable of applying an upward force to the carrier. When the locking device is in the locked state, the locking device interferes with the battery to limit the relative movement between the battery and the bracket. When the locking device is in the unlocked state, the interference between the locking device
(Continued)

and the battery is removed, so that the upward-force device drives the carrier carrying the battery to move upward relative to the bracket.

17 Claims, 22 Drawing Sheets

Related U.S. Application Data continuation of application No. 15/380,023, filed on Dec. 15, 2016, now Pat. No. 10,183,591.

(51) Int. Cl.
*B62M 6/40* (2010.01)
*B62M 6/90* (2010.01)
*H01M 50/20* (2021.01)
*B62K 25/28* (2006.01)
*B62K 25/30* (2006.01)

(52) U.S. Cl.
CPC ............... *B62M 6/40* (2013.01); *B62M 6/90* (2013.01); *H01M 50/20* (2021.01); *B60L 2200/12* (2013.01); *Y02T 10/70* (2013.01)

(58) Field of Classification Search
CPC ............ B62M 6/40; B62M 6/55; B62M 6/90; H01M 2/1083; Y02T 10/70; B62H 5/001
USPC ........................................................ 180/220
See application file for complete search history.

ELECTRIC BICYCLE AND BATTERY LIFT MECHANISM AND BATTERY CARRYING DEVICE THEREOF

BACKGROUND OF THE INVENTION

1. Field of the Invention

The invention generally relates to an electric bicycle and a battery lift mechanism and a battery carrying device thereof. Particularly, the invention relates to an electric bicycle and a battery lift mechanism and a battery carrying device thereof, which is capable of locking the battery and/or automatically lifting the battery.

2. Description of the Prior Art

Riding bicycles currently have become a popular outdoor activity, instead of merely a manner of traffic transportations. However, not every rider is physically capable of riding a long course or a tough mountain-climbing course. Electric bicycles are therefore designed with a motor to assist the rider's pedal-power.

Electric bicycles generally utilize batteries as the power source for motor, and the battery is usually mounted on the frame of bicycle. However, since the space on the frame is limited, the battery size is also restricted in order to provide an easy access to the battery. Moreover, in order to prolong the operation time of the assisted power, the capacity and size of battery are accordingly enlarged. The enlarged battery makes the mounting or dismounting process more difficult due to the complicated battery-carrying structure or the easiness of interfering with the frame, making the rider's experience less satisfaction. In addition, with the assistance of auxiliary power, the riders tend to explore the wild area, which usually has bad road condition, increasing the possibility of battery falling off the bicycle.

Therefore, how to enhance the battery carrying mechanism and effectively utilize the space on the frame with easy replacement of the battery is a challenging issue.

SUMMARY OF THE INVENTION

It is an object of the invention to provide an electric bicycle and a battery lift mechanism thereof, which has the upward-force device to make the battery automatically pop-up so as to increase the convenience of dismounting the battery from the bicycle.

In an embodiment, the invention provides a battery lift mechanism, which includes a bracket, a carrier for carrying a battery and movable relative to the bracket along an up-down path, an upward-force device coupling with the carrier and applying an upward force to the carrier, and a locking device being selectively in an unlocked state or a locked state, wherein when the locking device is in the locked state, the locking device interferes with the battery to limit the relative movement between the battery and the bracket; when the locking device is in the unlocked state, the interference between the locking device and the battery is removed, so that the upward-force device drives the carrier carrying the battery to move upward relative to the bracket.

In an embodiment, the upward-force device is a gas spring. The gas spring includes a cylinder and a rod. The rod is capable of extending relative to the cylinder due to pressure activation of the cylinder to drive the carrier to move upward.

In an embodiment, the bracket has a restraining portion for restraining a lateral movement of the battery with respect to the bracket.

In an embodiment, the locking device includes a lock body, a tongue, and an interfering unit. The tongue is capable of extending out or retracting into the lock body in response to the locked state or the unlocked state of the lock body. When the lock body is in the locked state, the tongue extends outward to push the interfering unit forward to interfere with the battery. When the lock body is in the unlocked state, the tongue retracts into the lock body to release the interference of the interfering unit with the battery.

In an embodiment, the interfering unit includes an engaging member and an elastic unit. When the lock body is in the locked state, the tongue extends outward to push the engaging member against the battery and compress the elastic unit. When the lock body is in the unlocked state, the tongue retracts and the elastic unit provides a restoring force to drive the engaging member away from the battery.

In an embodiment, the battery lift mechanism further includes a stopper rotatable relative to the bracket to selectively block or unblock the up-down path, wherein the locking device includes an engaging member and a lock body selectively in the locked state or the unlocked state. When the lock body is in the locked state, the engaging member interferes with the stopper to restrict the rotation of the stopper, so the stopper blocks the up-down path. When the lock body is in the unlocked state, the interference between the engaging member and the stopper is released, so the stopper is rotatable relative to the bracket to unblock the up-down path.

In an embodiment, the engaging member has two protrusions. When the lock body is in the locked state, the two protrusions interfere with the battery and the stopper, respectively. When the lock body is in the unlocked state, the interference of the engaging member with the battery and the stopper is released simultaneously.

In an embodiment, the battery lift mechanism further includes a cushion disposed on the stopper, wherein when the stopper blocks the up-down path, the cushion is pressed against the battery.

In another embodiment, the invention provides an electric bicycle, which includes a frame and a battery lift mechanism mounted on the frame. The frame includes an upper tube and a lower tube. The upper tube has a front end, an upper surface, a lower surface, and a through hole penetrating the upper tube. The lower tube is connected to the lower surface of the upper tube. The upper tube has a longitudinal axis. The battery lift mechanism includes a bracket mounted on the lower tube, a carrier for carrying a battery and movable relative to the bracket along an up-down path, an upward-force device coupling with the carrier and being capable of driving the carrier to move upward relative to the bracket along the up-down path, a stopper movably disposed neighboring to the through hole to selectively block or unblock the up-down path, and a locking device being disposed on the front end of the upper tube and selectively in an unlocked state or a locked state. The up-down path intersects the longitudinal axis with a predetermined angle. When the locking device is in the unlocked state, the locking device is separated from the stopper to allow the stopper to be away from the up-down path and the upward-force device drives the carrier carrying the battery to move upward relative to the bracket, so that a top end of the battery passes the through hole at the predetermined angle to protrude from the upper surface of the upper tube. When the locking device is in the locked state, the locking device interferes with at least one of the battery and the stopper to block the carrier carrying the battery to move upward along the up-down path.

In an embodiment, the battery has a longitudinal axis and a cross section perpendicular to the longitudinal axis. The cross section is smaller than the through hole in size. When the carrier carrying the battery moves along the up-down path, the longitudinal axis maintains parallel to the up-down path.

It is another object of the invention to provide an electric bicycle and a battery carrying device thereof to selectively lock the battery so as to restrict the dismounting of battery.

It is yet another object of the invention to provide an electric bicycle and a battery carrying device thereof to provide dual interference with the battery and the stopper to effectively enhance the locking of battery.

In an embodiment, the invention provides a battery carrying device for carrying a battery. The battery carrying device includes a carrier for carrying the battery which is movable along an in-out path to be removed from the carrier, a stopper selectively blocking or unblocking the in-out path, a lock body selectively in an unlocked state or in a locked state, and an engaging member movable relative to the lock body in response to the unlocked state or the locked state of the lock body. The engaging member includes a first engaging portion and a second engaging portion corresponding to the battery and the stopper, respectively. When the lock body is in the locked state, the first engaging portion interferes with the battery to restrict the battery to move along the in-out path, and the second engaging portion interferes with the stopper, so the stopper maintains blocking the in-out path. When the lock body is in the unlocked state, the interference of the first engaging portion with the battery and the interference of the second engaging portion with the stopper are released to allow the battery to move along the in-out path.

In an embodiment, the battery carrying device further includes a tongue moveably coupling with the lock body, wherein when the lock body is in the locked state, the tongue extends out the lock body in response to the locked state of the lock body to push the engaging member forward, so the first engaging portion and the second engaging portion interfere with the battery and the stopper, respectively. When the lock body is in the unlocked state, the tongue retracts into the lock body to release the interference of the first engaging portion with the battery and the interference of the second engaging portion with the stopper.

In an embodiment, the battery carrying device further includes a cushion disposed on the stopper, wherein when the stopper blocks the up-down path, the cushion is pressed against the battery.

In another embodiment, the invention provides an electric bicycle, which includes a frame and a battery carrying device described, which is mounted on the frame.

In an embodiment, the stopper is a cover. When the lock body is in the locked state, the cover blocks the in-out path. When the lock body is in the unlocked state, the cover is rotatable relative to the frame to allow the battery to move in and out the carrier.

BRIEF DESCRIPTION OF THE DRAWINGS

FIGS. 1A and 1B are schematic views of the electric bicycle in an embodiment of the invention, wherein FIG. 1A shows that the battery is seated on the battery lift mechanism, and FIG. 1B shows that the battery protrudes upward from the upper tube driven by the upward-force device.

FIGS. 4A and 4B are respectively schematic views the battery lift mechanism equipped with the decoration cover, wherein FIG. 4A shows that the battery is seated on the battery lift mechanism, and FIG. 4B shows that the battery moves upward.

FIGS. 5A and 5B are schematic view of the battery lift mechanism in another embodiment of the invention, wherein FIG. 5A shows that the battery moves upward, and FIG. 5B shows that the battery is seated on the battery lift mechanism.

FIGS. 6A to 6C are respectively partially schematic views and a perspective view of the electric bicycle in another embodiment of the invention, wherein FIG. 6A shows that the battery is locked on the frame by the battery carrying device; FIG. 6B shows that the battery carrying device releases interferences with the battery and the stopper to allow the battery to be removed from the frame; FIG. 6C is a partial perspective view of FIG. 6A.

DETAILED DESCRIPTION OF THE PREFERRED EMBODIMENT

The invention is related to an electric bicycle and a battery lift mechanism thereof to restrict the movements of battery for providing power during riding the bicycle and to provide an automatic battery lift function when the battery needs to be replaced or removed from the bicycle. Moreover, the invention is also related to an electric bicycle and a battery carrying device to restrict the movements of battery for providing power during riding the bicycle and to allow the battery to be movable when the battery needs to be replaced or removed from the bicycle. Hereinafter, the electric bicycle of the invention and the battery lift mechanism and the battery carrying device thereof will be described in detail with reference to the drawings.

Figure 1A:
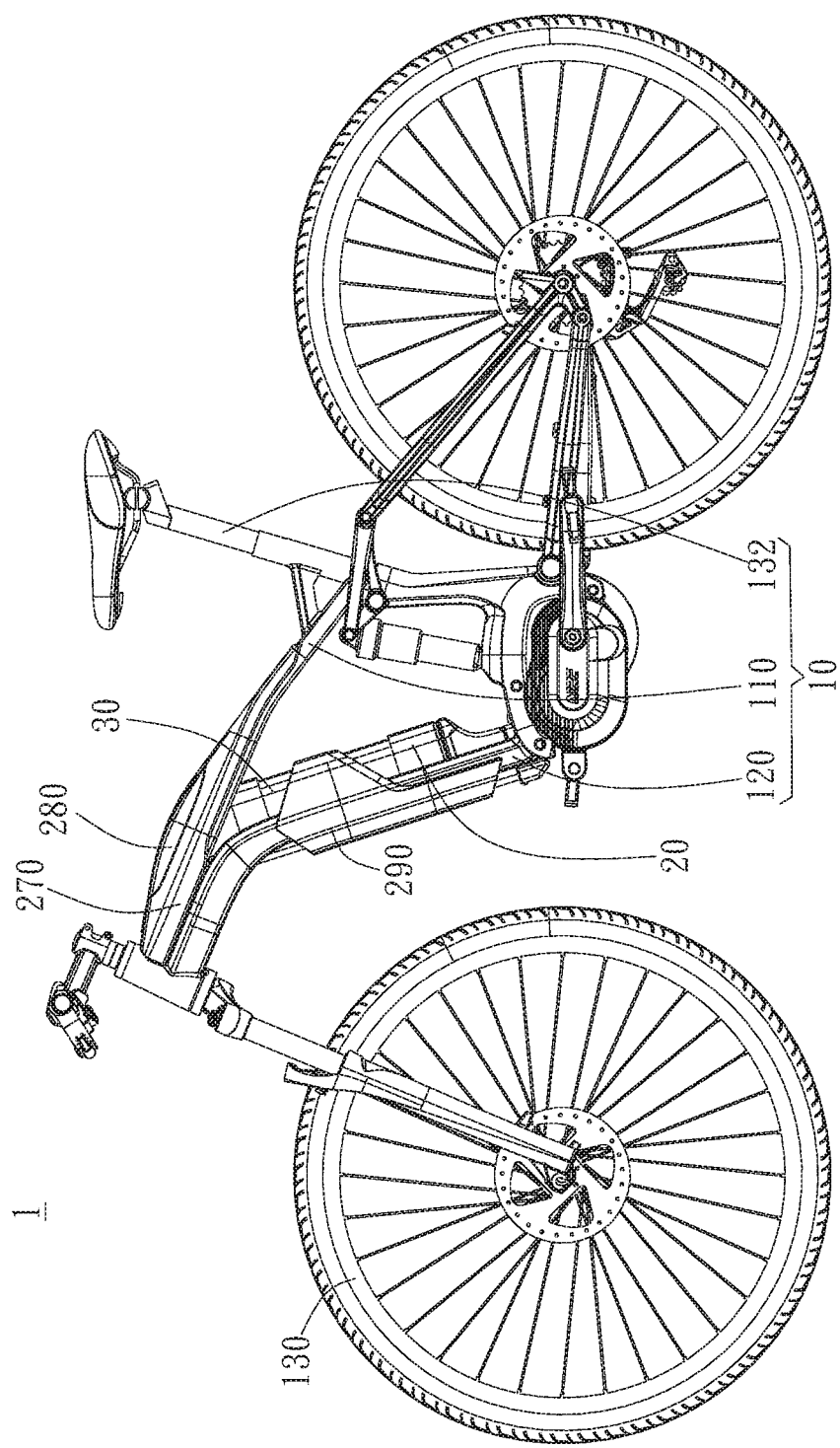
Figure 1B:
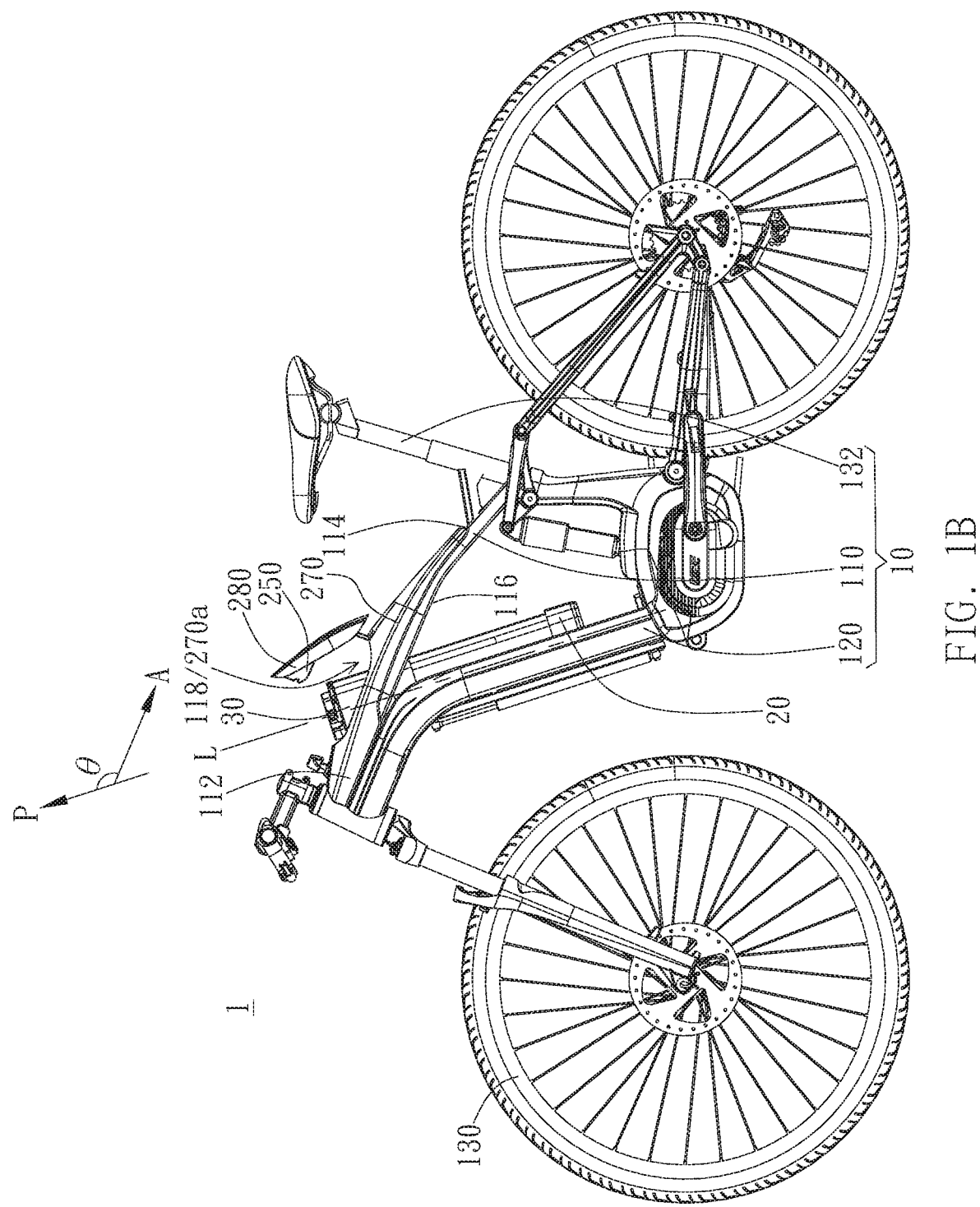
Figure 1C:
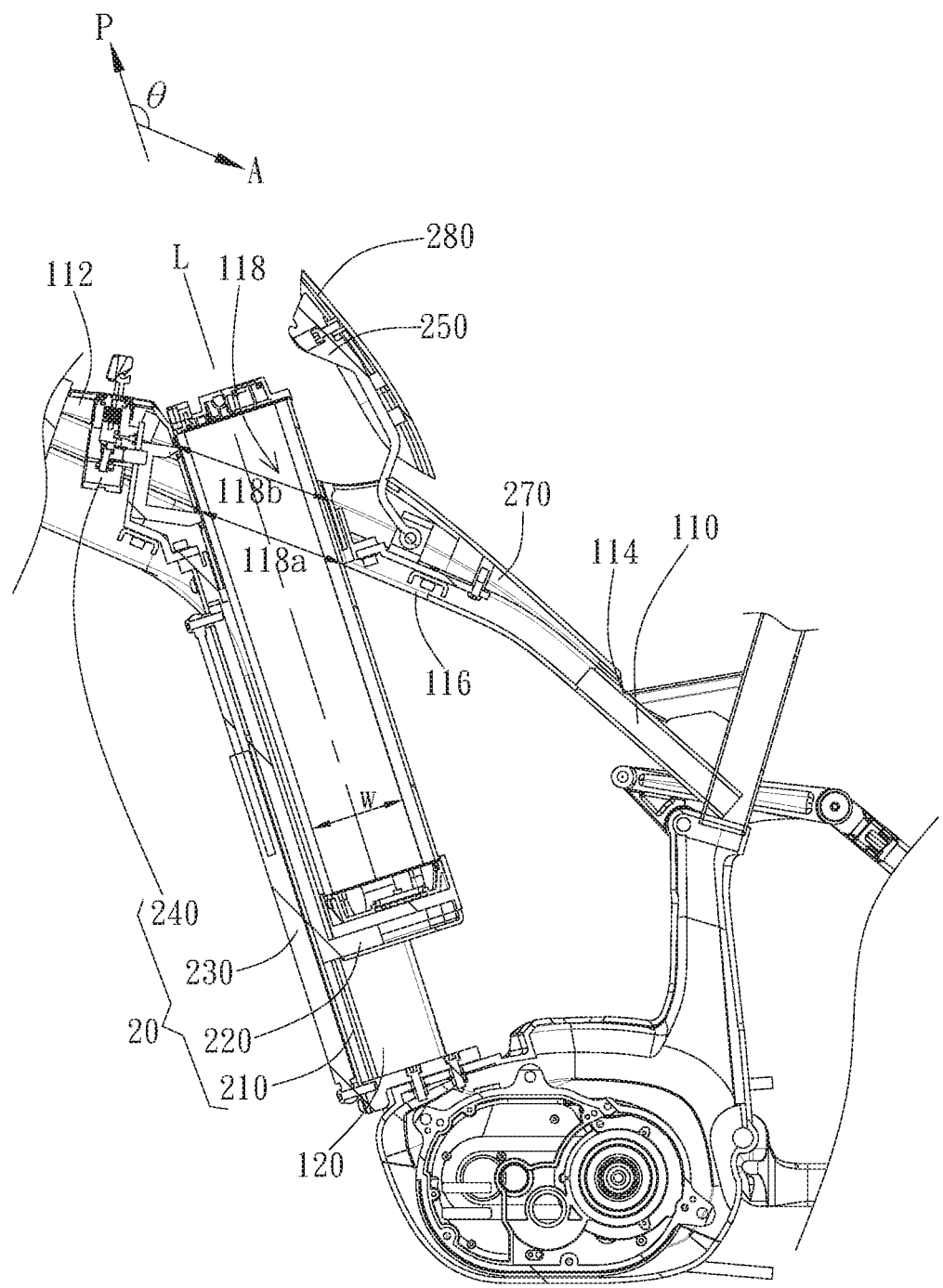
FIG. 1C is a partially enlarged view of FIG. 1B.
Figures 1, 2A:
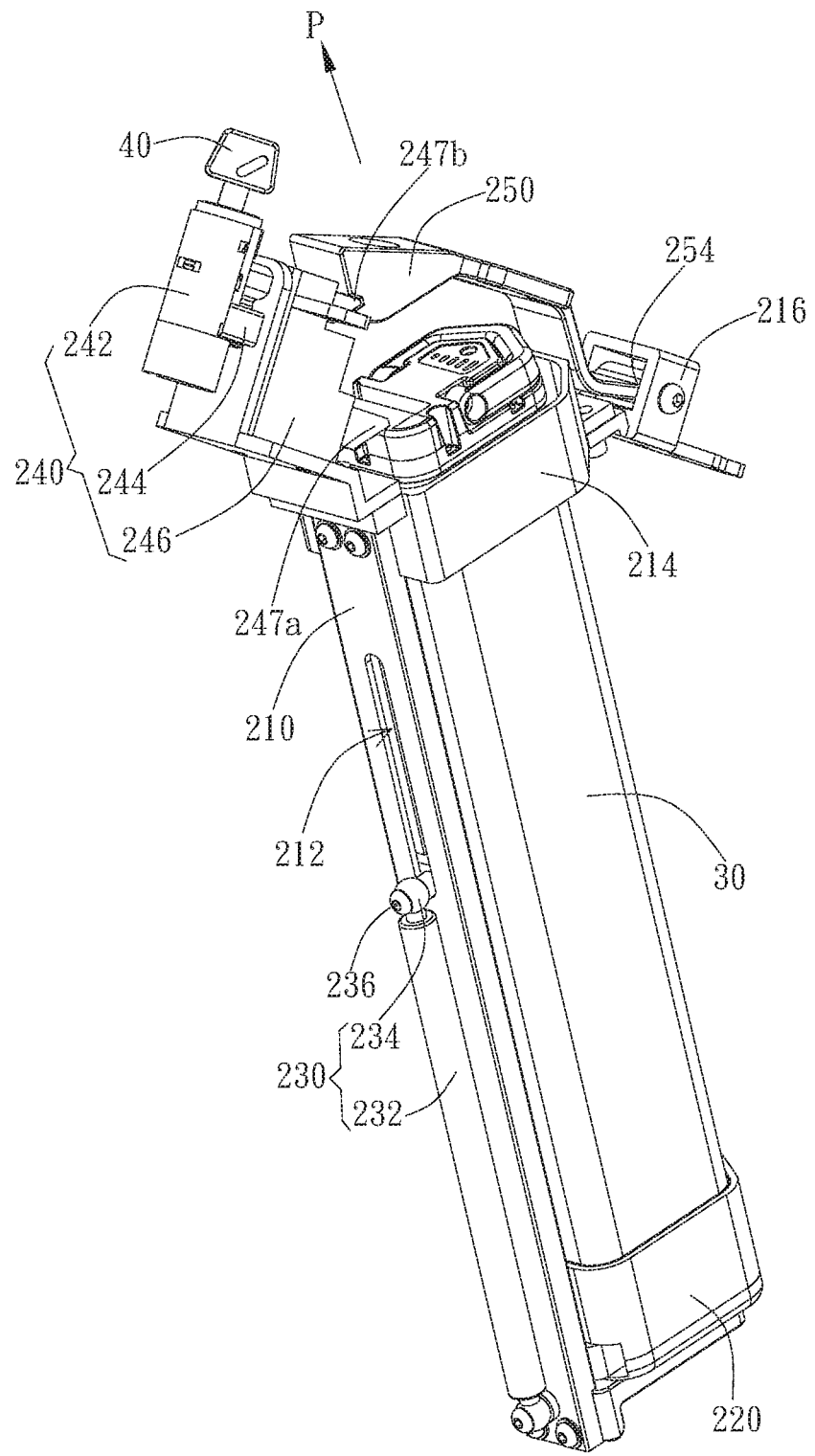
FIGS. 2A-1, 2A-2 and 2B are respectively a schematic view, an exploded view, and a cross-sectional view of the battery lift mechanism in an embodiment of the invention.
Figures 2, 2A:
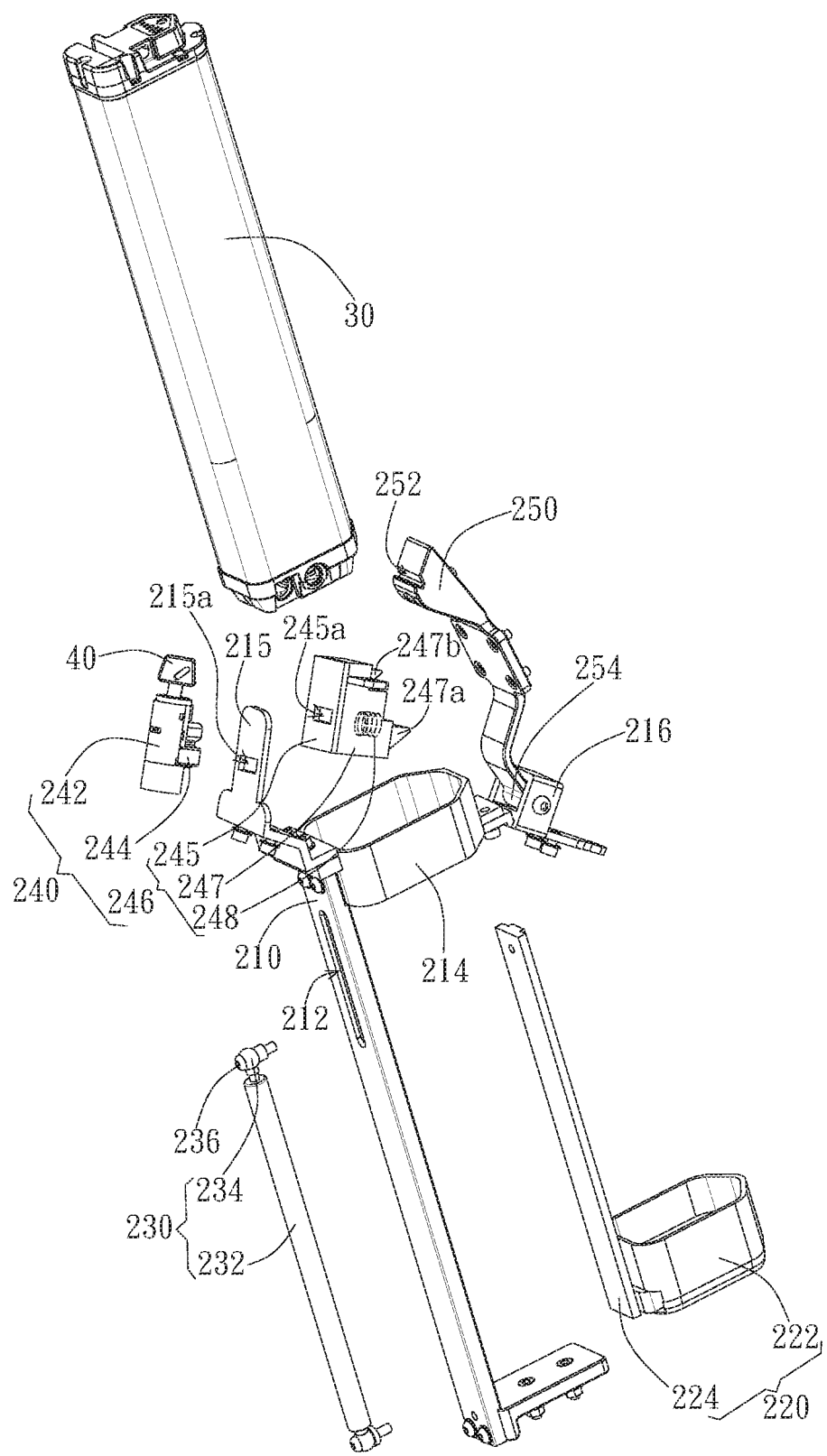
Figure 2B:
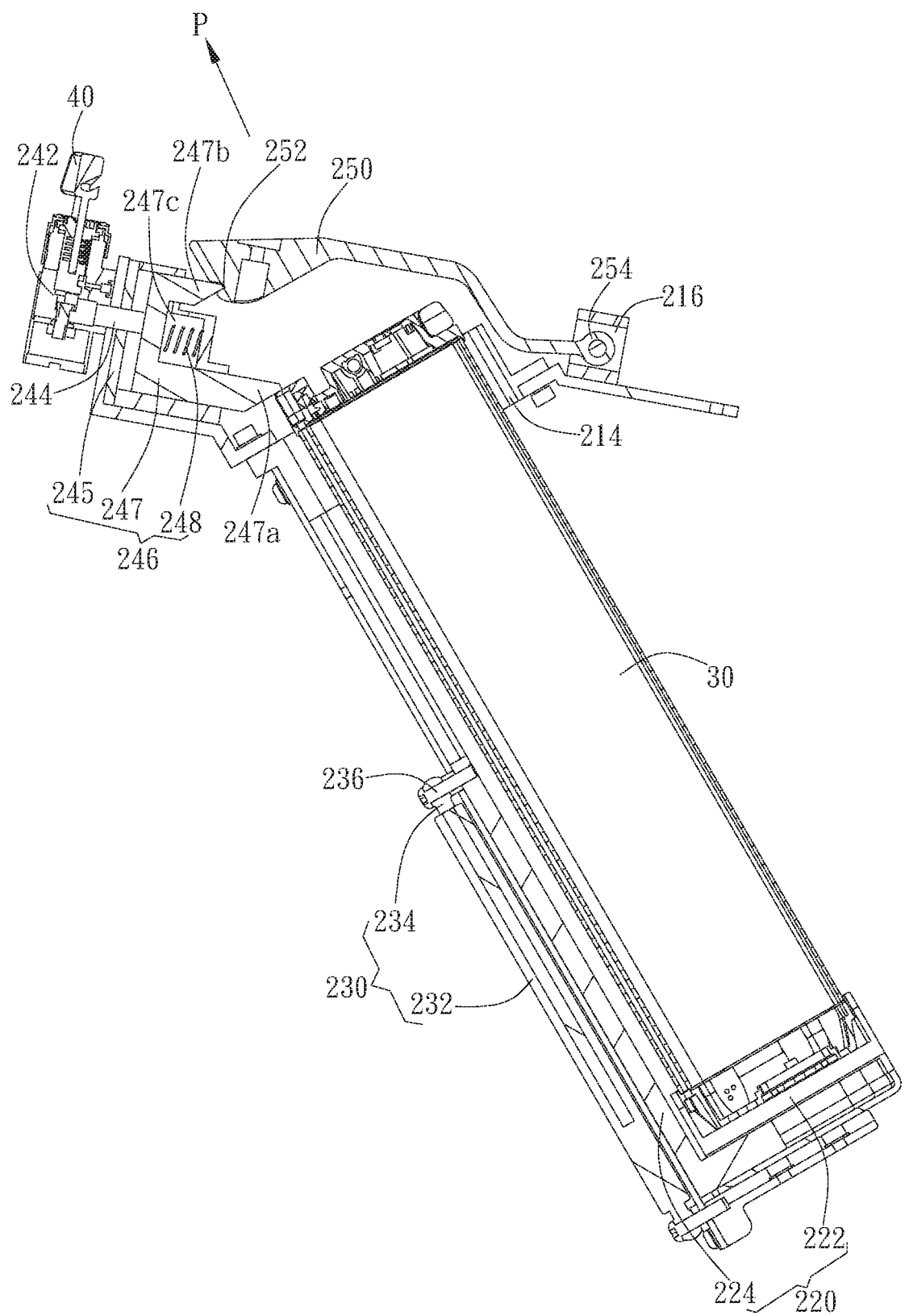
Figure 2C:
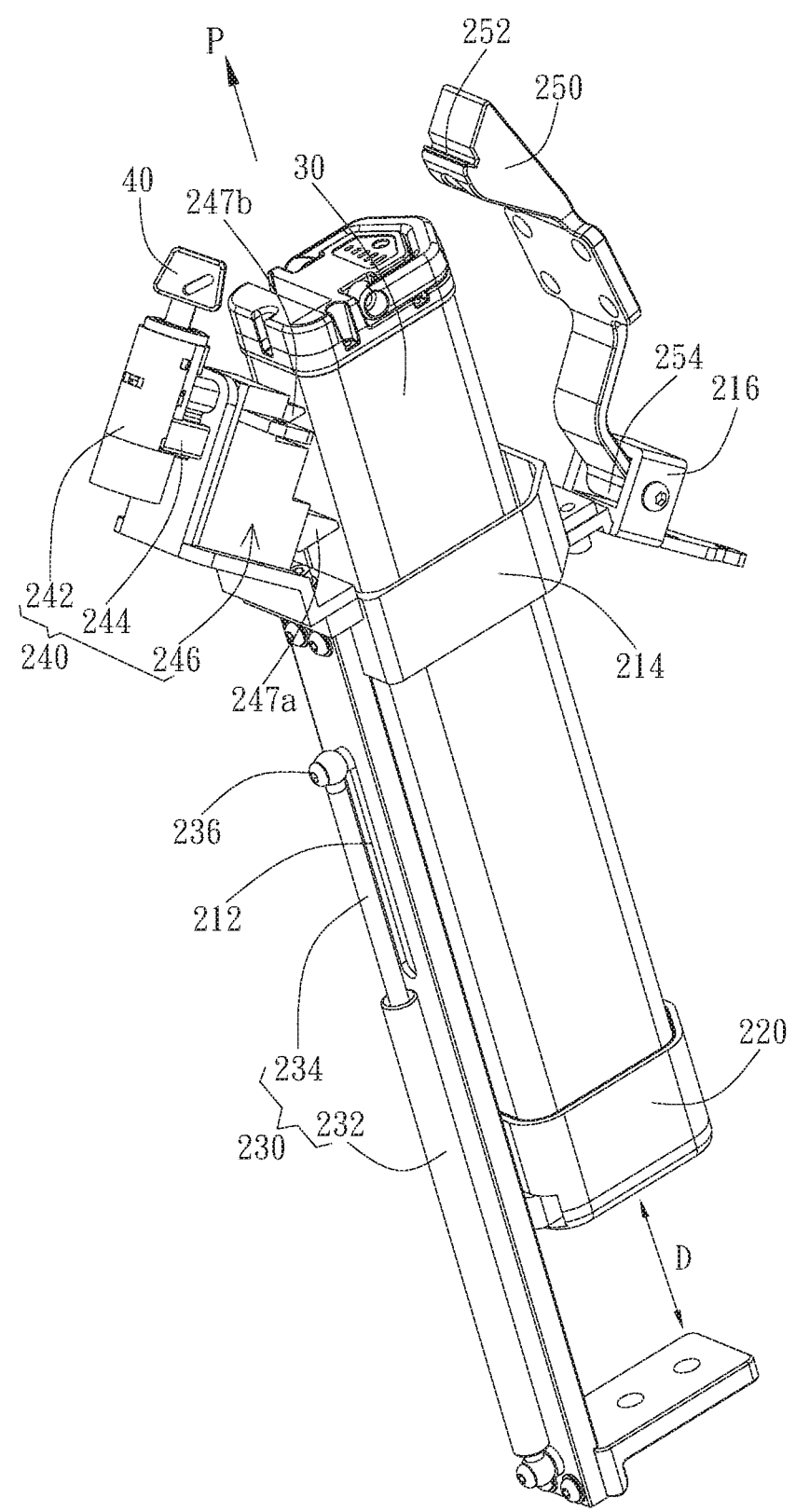
FIGS. 2C and 2D are respectively a schematic view and a cross-sectional view of the battery moving upward from the battery lift mechanism of FIGS. 2A-1 and 2B.
Figure 2D:
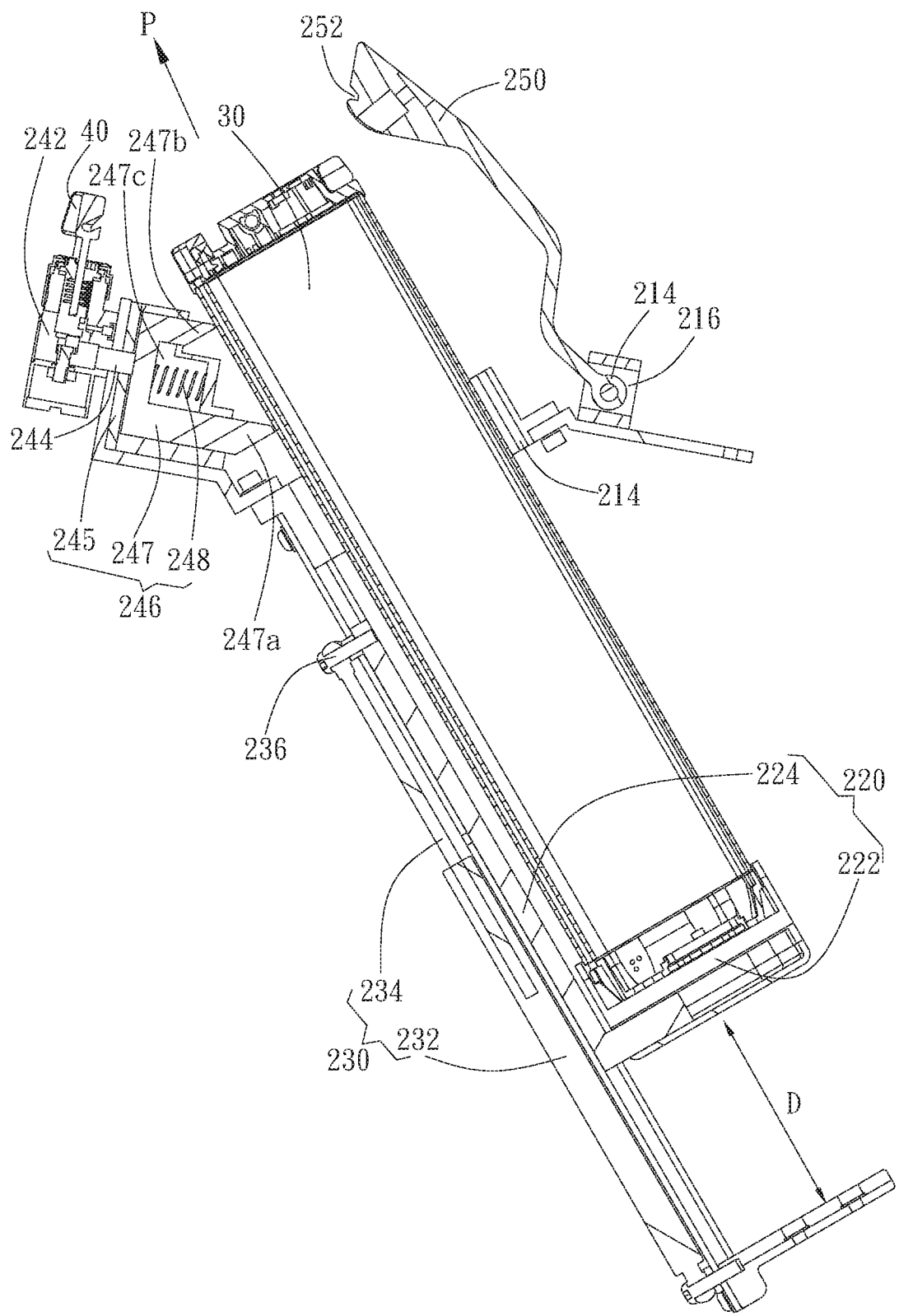

As shown in FIGS. 1A to 1C, in an embodiment, an electric bicycle 1 includes a frame 10 and a battery lift mechanism 20. The battery lift mechanism 20 is mounted on the frame 10 and includes a bracket 210, a carrier 220, an upward-force device 230, and a locking device 240. In this embodiment, the bracket 210 is configured to support the battery 30. The carrier 220 is configured to carry the battery 30 and is movable relative to the bracket 210 along an up-down path P. The upward-force device 230 couples with the carrier 220 and is capable of applying an upward force to the carrier 220. The locking device 240 can be selectively in an unlocked state or a locked state so as to allow or restrict the battery 30 to move relative to the bracket 210. As shown in FIGS. 2A-1 and 2B, when the locking device 240 is in the locked state, the locking device 240 interferes with the battery 30 to limit the relative movement between the battery 30 and the bracket 210, so as to ensure the battery providing power to the bicycle. As shown in FIGS. 2C and 2D, when the locking device 240 is in the unlocked state, the interference between the locking device 240 and the battery 30 is removed, so that the upward-force device 230 drives the carrier 220 carrying the battery 30 to move upward relative to the bracket 210.

As shown in FIG. 1A, in this embodiment, the frame 10 includes an upper tube 110, a lower tube 120, and a seat tube 132. The upper portion of the lower tube 120 is connected to the upper tube 110 and the middle portion of the lower tube 120 slants and extends downward and backward, so that the lower end of the lower tube 120 is connected to the seat tube 132. The bracket 210 of the battery lift mechanism 20 is preferably mounted on the lower tube 120 and extends along the lower tube 120. Particularly, the upper tube 110 is a tube of the frame 10 that has a longitudinal axis A extending from the front to the rear. The upper tube 110 has a front end 112, an upper surface 114, and a lower surface 116. The front end 112 of the upper tube 110 is neighboring to the front wheel 130. The upper surface 114 and the lower surface 116 of the upper tube 110 are two opposite surfaces of the tube in the radial direction that face upward away from the ground and downward closer to the ground, respectively. The lower tube 120 is connected to the lower surface 116 of the upper tube 110 and preferably slants and extends downward and backward from the lower surface 116 of the upper tube 110 that is adjacent to the front end 112. The upper tube 110 further has a through hole 118. The through hole 118 penetrates the upper tube 110 to form a channel for the battery 30 passing the upper tube 110 when the battery 30 moves upward. Specifically, the through hole 18 forms two openings on the upper surface 114 and the lower surface 116 of the upper tube 110. The through hole 118 is disposed neighboring where the lower tube 120 and the upper tune 110 are connected. When the carrier 220 carries the battery 30 to move upward, the battery 30 preferably moves upward along the lower tube 120, so that a top end of the battery 30 passes the through hole 118 from the lower surface 116 to protrude from the upper surface 114 of the upper tube 110. As such, the rider can grip the top end of the battery 30 to easily remove the battery 30 from the frame 10.

As shown in FIG. 1C, the battery 30 has a longitudinal axis L. When the battery 30 is seated on the carrier 220, the longitudinal axis L is preferably parallel to the extending direction of the bracket 210, and the up-down path P intersects the longitudinal axis A with a predetermined angle θ. When the carrier 220 carries the battery 30 to move along the up-down path P, the longitudinal axis L preferably maintains parallel to the up-down path P, so that the top end of the battery 30 passes the through hole 118 at the predetermined angle θ to protrude from the upper surface 114 of the upper tube 110. Moreover, the battery 30 has a cross section perpendicular to the longitudinal axis L, and the cross section is smaller than the through hole 118 in size. Specifically, the widths 118a, 118b of the openings of the through hole 118 on the lower surface 116 and the upper surface 114 are larger than the width W of the cross section. It is noted that the widths 118a, 118b can be modified according to the predetermined angle θ. For example, when the difference of the predetermined angle θ and the right angle (i.e. 90 degrees) becomes larger, i.e. the battery 30 is more inclined with respect to the upper tube 110, the widths 118a, 118b of the through hole 118 become larger. when the predetermined angle θ approaches to the right angle (i.e. 90 degrees), i.e. the battery 30 stands more upright with respect to the upper tube 110, the widths 118a, 118b of the through hole 118 become smaller. In this embodiment, the predetermined angle θ is preferably larger than 90 degrees, but not limited thereto. In another embodiment, according to the connected angle of the upper tube 110 and the lower tube 120, the predetermined angle θ can be smaller than or equal to 90 degrees.

The battery lift mechanism 20 further includes a stopper 250. The stopper 250 is movably disposed neighboring to the through hole 118 to selectively block or unblock the up-down path P. Particularly, the stopper 250 is rotatable relative to the upper surface 114 of the upper tube 110 to selectively at least partially shield the opening of the through 118 on the upper surface 114 of the upper tube 110 so as to block the up-down path P. In this embodiment, when the locking device 240 is in the locked state, the locking device 240 interferes with at least one of the battery 30 and the stopper 250 to block the carrier 220 carrying the battery 30 to move upward along the up-down path P. Hereinafter, the battery lift mechanism 20 of the invention will be described in detail with reference to the drawings.

As shown in FIGS. 2A-1 to 2D, in an embodiment, the upward-force device 230 is a gas spring. The gas spring includes a cylinder 232 and a rod 234. The rod 234 is capable of extending relative to the cylinder 232 due to pressure activation of the cylinder 232 to drive the carrier 220 to move upward. The bracket 210 has a slot 212 for guiding the movement of the rod 234. The upward-force device 230 and the carrier 220 are disposed on two opposite sides with respect to the slot 212. The rod 234 is connected to the carrier 220 through the slot 212 and moves relative to the cylinder 232 along the slot 212. Particularly, the slot 212 extends along the longitudinal axis of the bracket 210 and the extending direction of the slot 212 is parallel to the up-down path P. The carrier 220 includes a base 222 and a connection part 224. The base 222 carries and supports the battery 30, and the connection part 224 extends along the bracket 210 and connects the rod 234. Moreover, the base 222 of the carrier 220 can be disposed with electrical contacts for electrically connecting the battery 30, but not limited thereto. In this embodiment, the base 222 and the connection part 224 are connected as an L-shaped carrier 220, and the rod 234 and the base 222 are connected to two opposite ends (i.e. top end and bottom end) of the connection part 224, respectively. In this embodiment, the rod 234 can be connected to the connection part 224 by a bolt 236. Specifically, the bolt 236 extends from one side of the rod 234 and passes through the slot 212 to be secured to the connection part 224, so that when the rod 234 moves with respect to the cylinder 232 along the slot 212, the movement of the rod 234 can drive the carrier 220 to move relative to the bracket 210 and the battery 30 accordingly moves relative to the bracket 210.

The bracket 210 further has a restraining portion 214 for restraining a lateral movement of the battery 30 with respect to the bracket 210. The restraining portion 214 is preferably disposed on an end of the bracket 210 along the longitudinal direction opposite to the carrier 220, such as on the end of the bracket 210 that is neighboring to the upper tube 110. The restraining portion 214 is embodied as a restraining ring that protrudes from the bracket 210 and surrounds the battery 30, but not limited thereto. In another embodiment, the restraining portion 214 can be embodied as restraining bars or plates that protrudes from two sides of the bracket 210 to be positioned on the lateral sides of the battery 30. Moreover, a plurality of restraining portions 214 can be separately disposed on the bracket 210 along the longitudinal direction.

The locking device 240 includes a lock body 242, a tongue 244, and an interfering unit 246. The tongue 244 is capable of extending out or retracting into the lock body 242 in response to the locked state or the unlocked state of the lock body 242, so the interfering unit 246 can selectively interfere with at least one of the battery 30 and the stopper 250. In an embodiment, the interfering unit 246 includes a base plate 245, an engaging member 247, and an elastic unit 248. The engaging member 247 is movable relative to the base plate 245 to selectively compress the elastic unit 248. In this embodiment, the locking device 240 is preferably disposed corresponding to the bracket 210, and the bracket 210 further has a positioning plate 215, so the lock body 242 and the interfering unit 246 are disposed on two opposite sides of the bracket 210, respectively. The positioning plate 215 further has an opening 215a, and the base plate 245 has a hole 245a communicating with the opening 215a to form a channel for the tongue 244 accessing the interfering unit 247, but not limited thereto. In another embodiment, the locking device 240 can be mounted on other parts, such as the upper tube 110, of the electric bicycle by other configurations. Hereinafter, the embodiment of the engaging member 247 simultaneously interfering with the battery 30 and the stopper 250 will be described in detail. However, in another embodiment, the engaging member 247 can be designed to interfere with only one of the battery 30 and the stopper 250. It is noted that the battery lift mechanism 20 preferably includes the stopper 250, but in the case that the engaging member 247 is designed to interfere with only the battery 30, the battery lift mechanism 20 may or may not have the stopper 250.

In this embodiment, the interfering unit 246 is fixed on the positioning plate by the base plate 245, so the engaging member 247 can move relative to the base plate 245 and the positioning plate 215. The engaging member 247 has two protrusions 247a, 247b, which interfere with the battery 30 and the stopper 250, respectively. The engaging member 247 can be embodied as a U-shaped block with two sidewalls of different lengths to form as the protrusions 247a, 247b at the distal end and a space 247c enclosed between the two sidewalls. The stopper 250 has a recess 252 corresponding to the protrusion 247b. The elastic unit 248 can be embodied as a spring and disposed in the space 247c of the engaging member 247 and between the engaging member 247 and the base plate 245. In this embodiment, the lock body 242 is a key lock, but in another embodiment, the lock body 242 can be a combination lock. The tongue 244 couples with the lock body 242. When the lock body 242 is in the unlocked state, the tongue 244 is allowed to move relative to the lock body 242. When the lock body 242 is in the locked state, the tongue 244 is restricted to move relative to the lock body 242.

The bracket 210 further has a first pivot portion 216, and the stopper 250 has a second pivot portion 254 corresponding to the first pivot portion 216. The first pivot portion 254 couples with the second pivot portion 216 to form a pivot, so that the stopper 250 can rotate relative to the bracket 210 to selectively block or unblock the up-down path P. The first pivot portion 216 and the locking device 240 are preferably disposed on two opposite sides of the bracket 210, respectively, so when the stopper 250 rotates relative with the bracket 210, the stopper 250 rotates away from or close to the locking device 240. The first pivot portion 216 is preferably disposed at one side of the restraining portion 214 and away from the slot 212. The second pivot portion 254 and the recess 252 are disposed on two opposite sides of the stopper 250, respectively. It is noted that in this embodiment, the stopper 250 is illustrated as being rotatable relative to the bracket 210 and then disposed on the upper tube 110 corresponding to the through hole 118, but not limited thereto. In another embodiment, the stopper 250 can be directly and rotatably mounted on the upper tube 110, so the stopper 250 can selectively rotate relative to the bracket 210 to approach or move away from the locking device 240 and to achieve the function of blocking or unblocking the up-down path P.

Moreover, the stopper 250 is preferably designed to automatically rotate relative to the bracket 210 as the locking device 240 does not interfere with the stopper 250, so the stopper 250 can automatically rotate away from the trough hole 118 to unblock the up-down path P. For example, a torsion spring can be disposed where the first pivot portion 216 and the second pivot portion 245 couple, so when the interference with the stopper 250 is released, the stopper 250 can automatically rotate relative to the bracket 210 and away from the through hole 118 to unblock the up-down path P due to the restoring force of the torsion spring, but not limited thereto. In another embodiment, the stopper 250 can manually rotate relative to the bracket 210.

Referring to FIGS. 2A-1 and 2B as well as FIG. 1A, the battery 30 mounted on the battery lift mechanism 20 is illustrated. As shown in FIGS. 2A-1 and 2B, when the battery 30 is mounted on the batter lift mechanism 20, the stopper 250 rotates to be located above the through hole 118 (i.e. above the battery 30) to block the up-down path P, and the rod 234 of the upward-force device 230 is located at the bottom of the slot 212, so the carrier 220 is located at the bottom of the bracket 210. In this configuration, the lock body 242 is in the locked state, so the tongue 244 extends outward to push the interfering unit 246 to interfere with at least one of the battery 30 and the stopper 250. Particularly, when the lock body 242 is in the locked state, the tongue 244 extends outward to pass through the opening 215a of the positioning plate 215 and the hole 245a of the base plate 245 to push the engaging member 247 toward the battery 30 and the stopper 250 and compress the elastic unit 248. The movement of the engaging member 247 drives the protrusion 247a against the top portion of the battery 30 and the protrusion 247b engaging with the recess 252 of the stopper 250. As such, the battery 30 can be stably seated on the battery lift mechanism 20 to provide power to the electric bicycle 1.

Referring to FIGS. 2C and 2D as well as FIG. 1B, the operation of the battery lift mechanism 20 is illustrated. As shown in FIGS. 2C and 2D, when the lock body 242 is in the unlocked state, the tongue 244 retracts to release the interference of the interfering unit 246 with the battery 30 and/or the stopper 250. Particularly, the user can use a key 40 to rotate the lock core of the lock body 242 or input the correct combination to enable the lock body 242 to be in the unlocked state, so the tongue 244 becomes movable, or to enable the lock body 242 to be in the locked state and drive the tongue 244 to retract into the lock body 242. When the tongue 244 retracts toward the lock body 242, the compressed elastic unit 248 provides the restoring force to drive the engaging member 247 to move away from the battery 30 and the stopper 250 (i.e. move toward the retracting direction of the tongue 244), so the protrusion 247a separates from the top portion of the battery 30 and the protrusion 247b separates from the recess 252 of the stopper 250, simultaneously, to release the interference with the battery 30 and the stopper 250. In this configuration, the user can manually rotate the stopper 250 or the stopper 250 can automatically rotate by the restoring force of the torsion spring, so the stopper 250 rotates away from the locking device 240 to unblock the up-down path P. When the up-down path P is unblocked, the rod 234 of the upward-force device 230 extends relative to the cylinder 232 due to pressure activation of the cylinder 232 to move from the bottom to the top of the slot 212 and to drive the carrier 220 carrying the battery 30 to move upward along the up-down path P by a predetermined distance D. As such, the top end of the battery 30 passes the through hole 118 at the predetermined angle θ to protrude from the upper surface 114 of the upper tube 110, so the user can easily remove the battery 30 from the frame 10 by gripping the top end of the battery 30.

When the battery 30 is to be mounted on the electric bicycle 1, the locking device 240 is in the unlocked state, and the tongue 244 is movable relative to the lock body 242. As such, the battery 30 can be inserted into the through hole 18 from the upper surface 114 of the upper tube 110 and passes the restraining portion 214 to be seated on the base 222 of the carrier 220, and a force sufficient to overcome the upward-force provided by the upward-force device 230 can be exerted to push the battery 30 and the carrier 220 to move toward the bottom of the bracket 210 while the rod 234 of the upward-force device 230 also moves toward the bottom of the slot 212, i.e. the rod 234 retracts relative to the cylinder 232. Then, the stopper 250 can rotate relative to the bracket 210 approaching the engaging member 217, i.e. the stopper 250 rotates to be at least partially right above the through hole 118 (i.e. above the battery 30) to block the up-down path P. In this configuration, the user can rotate the key 40 in the key lock or dial the wheels of the combination lock to make the lock body 242 become locked, so that the tongue 244 is not allowed to retract toward the lock body 242 and the engaging member 247 is pushed by the tongue 244 to compress the elastic unit 248. Consequently, the protrusions 247a, 247b interfere with the battery 30 and the stopper 250, respectively, and the locked state shown in FIGS. 2A-1 and 2B is achieved.

Figure 3A:
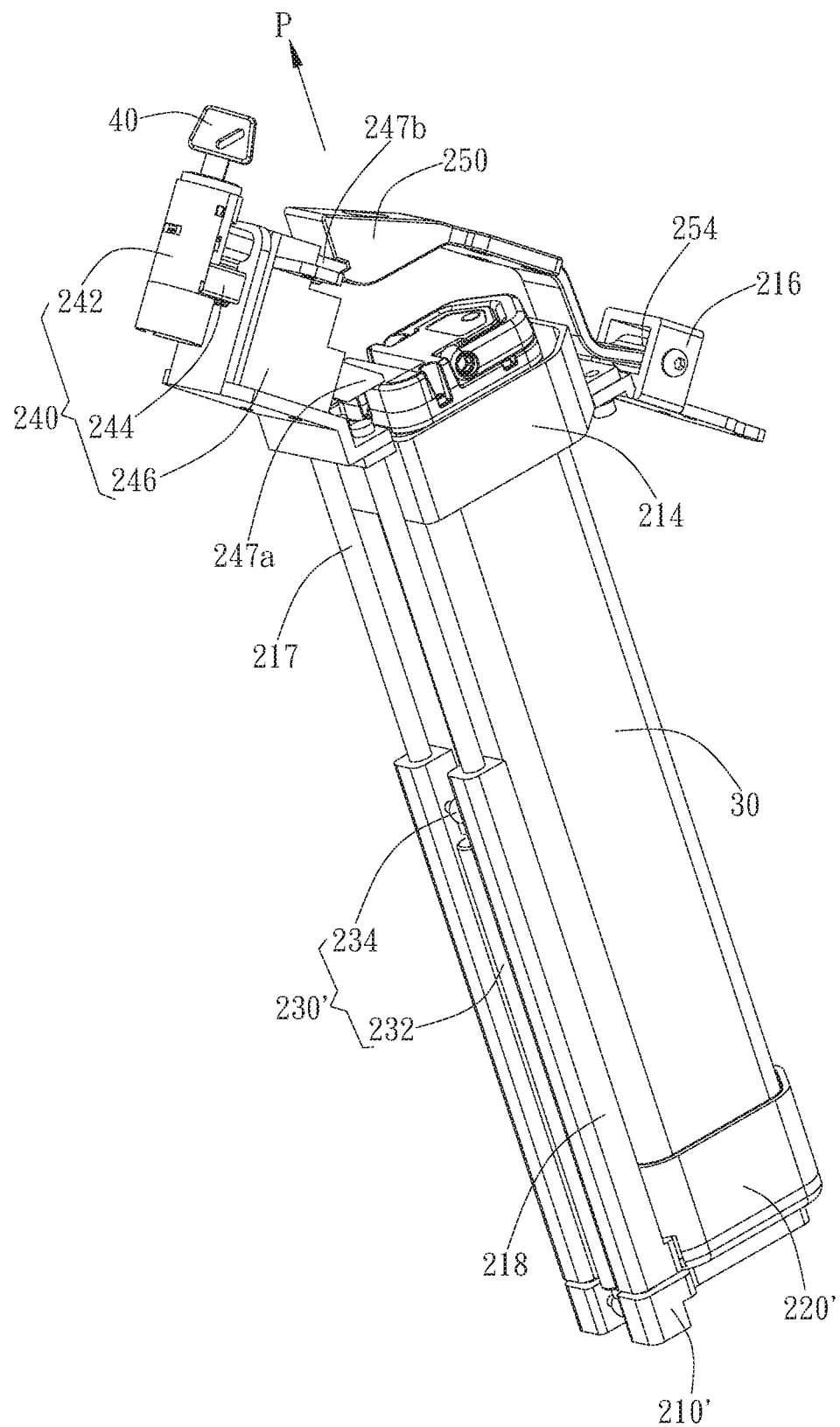
FIG. 3A is a schematic view of the battery lift mechanism in another embodiment of the invention.
Figure 3B:
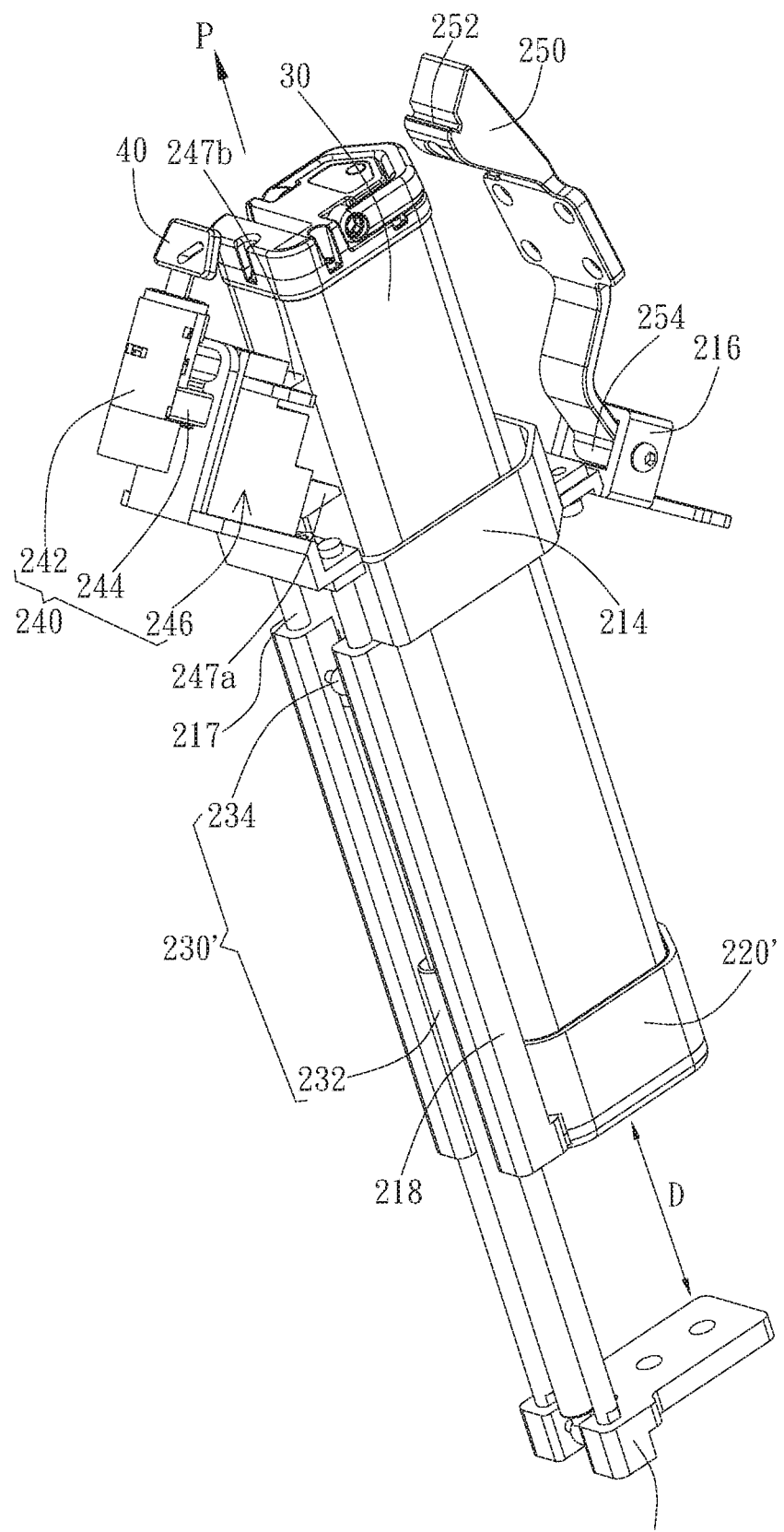
FIGS. 3B and 3C are respectively a schematic view and a cross-sectional view of the battery moving upward from the battery lift mechanism of FIG. 3A.
Figure 3C:
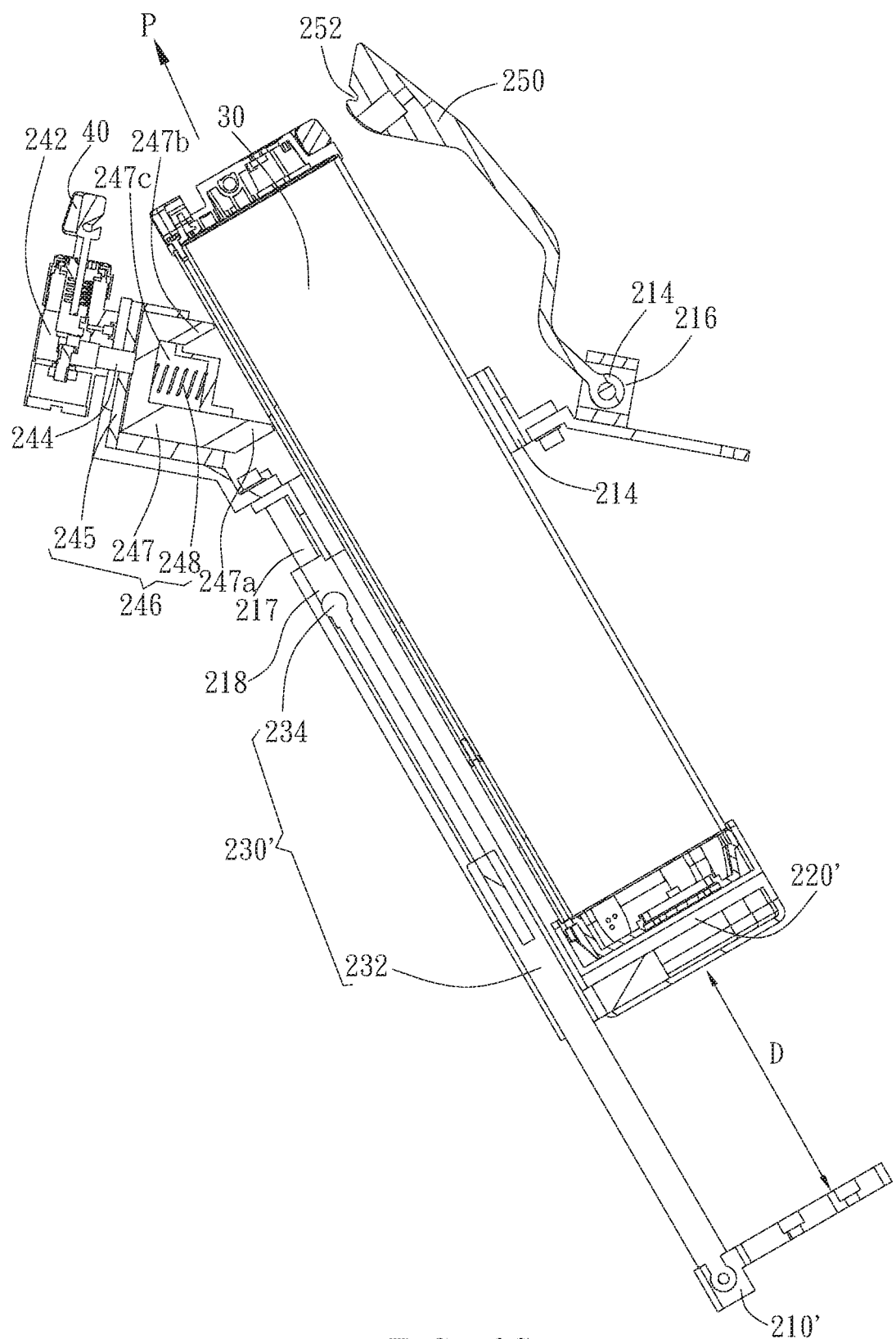

In addition, the bracket 210 can have different guiding designs and not limited to the slot 212. In another embodiment, as shown in FIGS. 3A to 3C, the bracket 210', the upward-force device 230' and the carrier 220 are guided by the rail 217 and the sliding block 218. Hereinafter, the difference between this embodiment and the embodiment of FIGS. 2A-1 to 2D will be described, other similar components, such as the locking device 240, the stopper 250, etc. can refer to the related descriptions of the above embodiment. In this embodiment, the bracket 210' includes the rail 217 and the sliding block 218. The sliding block 218 is slidably disposed on the rail 217 and connected to the carrier 220'. The rod 234 couples with the sliding block 218 to drive the sliding block 218 and the carrier 220' to move along the rail 217. In this embodiment, the bracket 210' has two sets of rails 217 and sliding blocks 218. The rail 217 extends along the up-down path P (i.e. the longitudinal axis of the bracket 210'). The carrier 220' and the rod 234 of the upward-force device 230' are respectively connected to two opposite ends (e.g. the lower end and the upper end) of the sliding block 218, and the carrier 220' and the upward-force device 230' are respectively disposed on two opposite sides (e.g. the right hand side and the left hand side) of the sliding block 218. In this embodiment, the carrier 220' can be designed to have a configuration similar to the base 222, but not limited thereto. The upward-force device 230' is preferably disposed between the two rails 217, so that rod 234 can be connected to the sliding blocks 218 on two sides.

As shown in FIG. 3A, when the battery 30 is mounted on the battery-lift mechanism, the stopper 250 rotates to be above the top end of the battery 30 to block the up-down path P, and the sliding blocks 218 are on the bottom of the rails 217, so the rod 234 of the upward-force device 230' is retracted with respective to the cylinder 232 and the carrier 220' is located on the bottom of the bracket 210'. In this configuration, the lock body 242 is in the locked state, and the tongue 244 extends outward to push the engaging member 247 against the battery 30 and the stopper 250 and compress the elastic unit 248. As such, the protrusion 247a presses against the top end of the battery 30 and the protrusion 247b is engaged with the recess 252 of the stopper 250. Consequently, the battery 30 is stably mounted on the battery lift mechanism to provide power to the electric bicycle 1.

As shown in FIGS. 3B and 3C, when the lock body 242 is in the unlocked state, the tongue 244 retracts into the lock body 242 and the compressed elastic unit 248 provides the restoring force to drive the engaging member 247 to move away from the battery 30 and the stopper 250, (i.e. move toward the retracting direction of the tongue 244), so the protrusion 247a moves away from the top end of the battery 30 and the protrusion 247b leaves the recess 252 of the stopper 250. As such, the interferences of the engaging member 247 with the battery 30 and the battery 250 are removed. In this configuration, the stopper 50 is allowed to rotate away from the locking deice 240 to unblock the up-down path P. At the same time, the rod 234 of the upward-force device 230' extends relative to the cylinder 232 due to pressure activation of the cylinder 232 to move from the bottom to the top of the rail 217 and to drive the sliding blocks 218 as well as the carrier 220' carrying the battery 30 to move upward along the up-down path P by the predetermined distance D. As such, the top end of the battery 30 passes the through hole 118 at the predetermined angle θ to protrude from the upper surface 114 of the upper tube 110, so the user can easily remove the battery 30 from the frame 10 by gripping the top end of the battery 30. When the battery 30 is to be mounted on the battery lift mechanism, the operation of inserting the battery 30 into the through hole 118 to be seated on the base 222 and the locking operation of the locking device back to the locked state of FIG. 3 are similar to those described in the above embodiment, and will not be elaborated again.

Figure 4A:
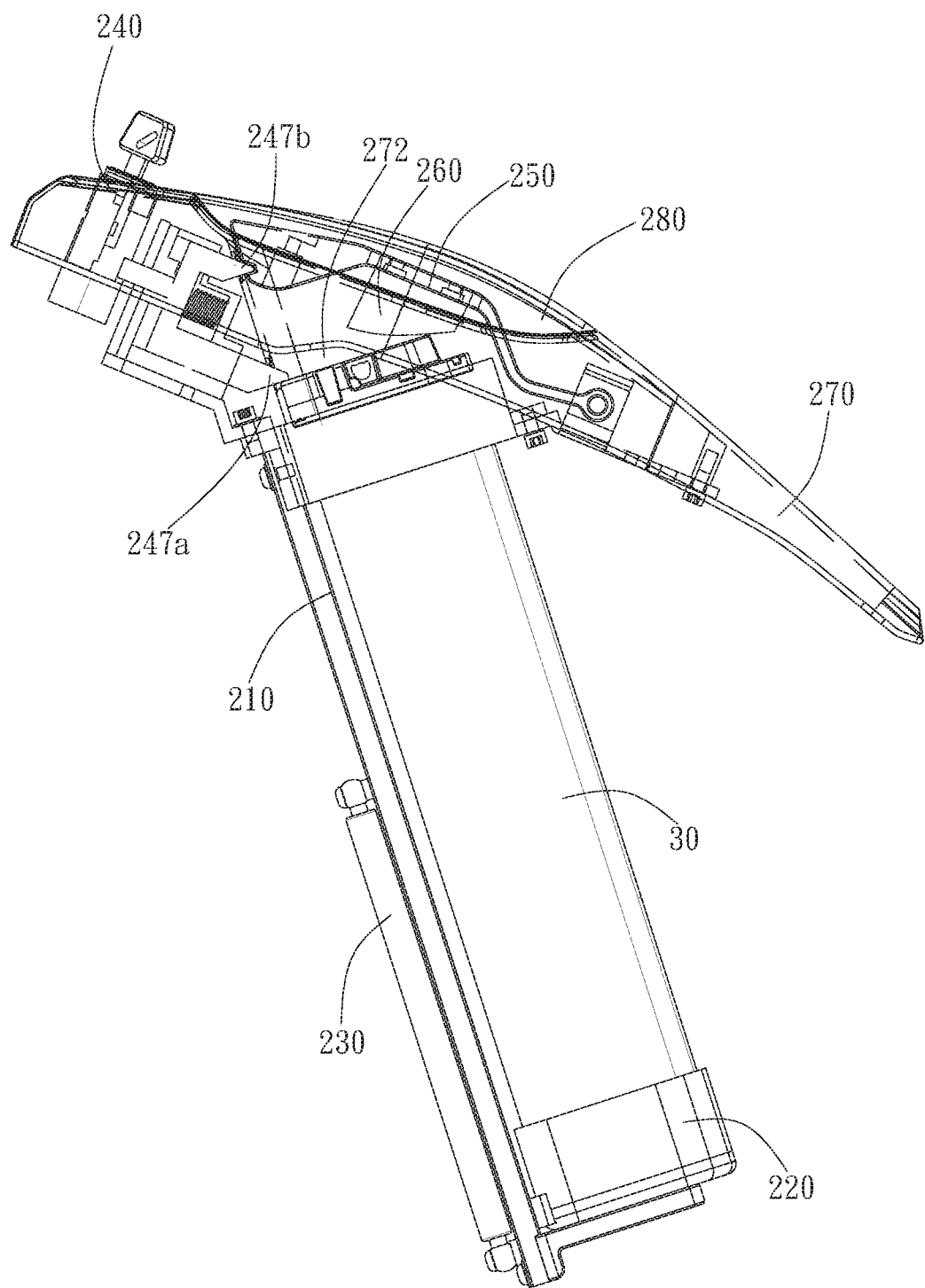
Figure 4B:
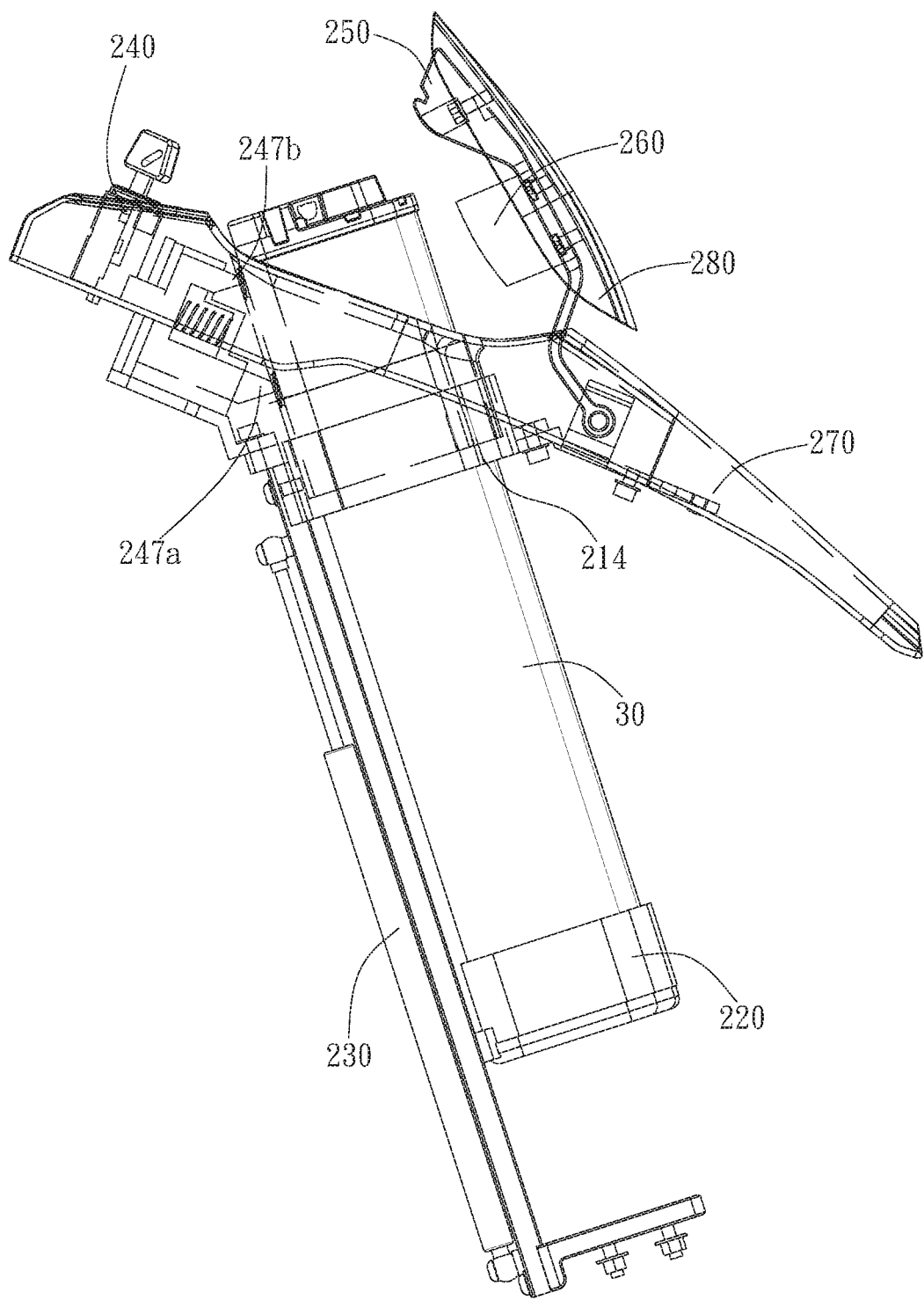
Figure 4C:
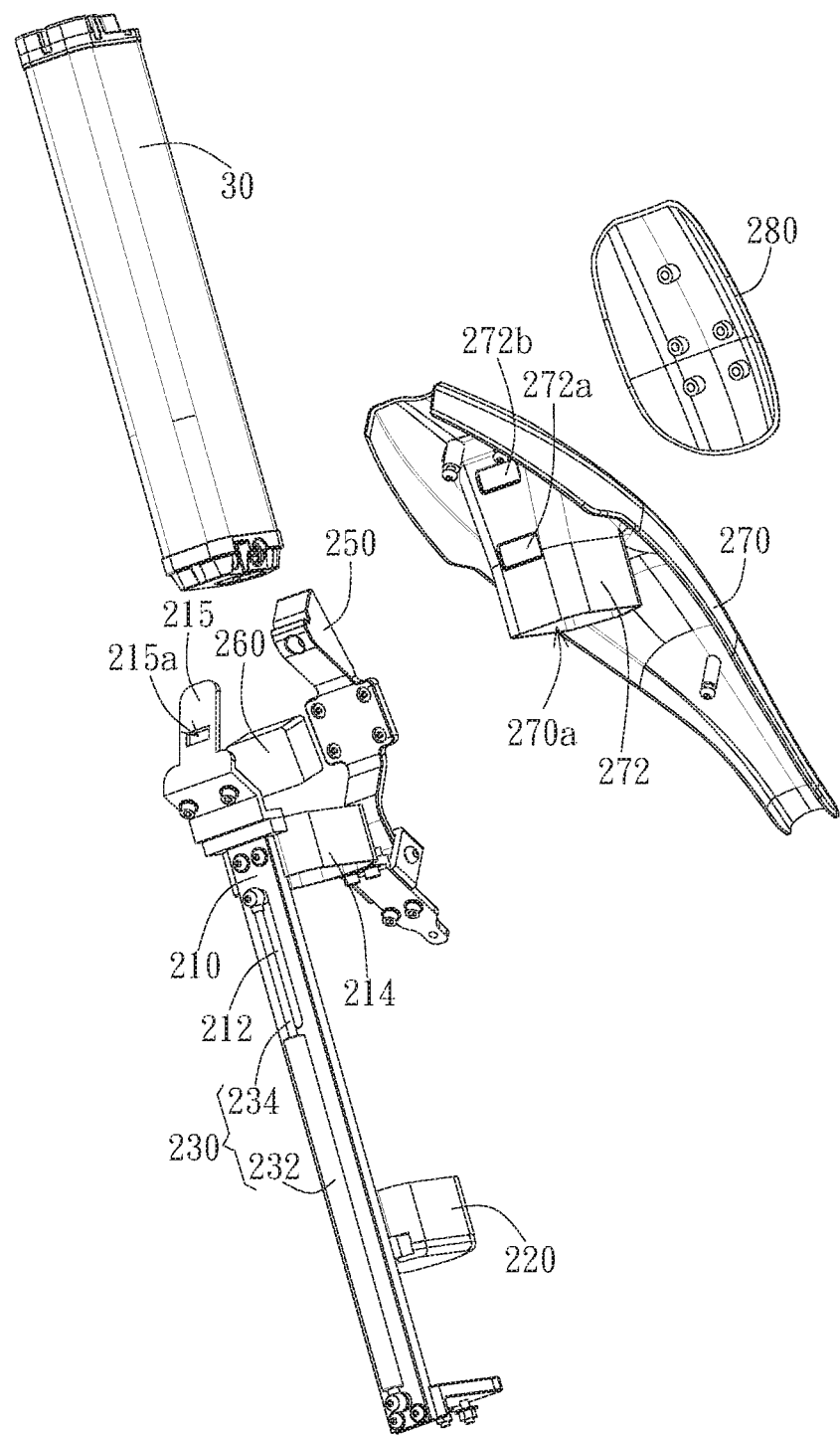
FIG. 4C is an exploded view of FIG. 4A without showing the locking device.

Moreover, a variety of decoration covers or cushion materials can be employed to enhance the mounting stability of the battery 30 and the exterior appearance and of the frame 10 of the electric bicycle 1. As shown in FIG. 1A, a lower decoration cover 290 is disposed on one side of the lower tube 120 to cover the lower tube 120 and the upward-force device 230, and a positioning decoration cover 270 and an upper decoration cover 280 are respectively disposed on the upper tube 110 and the stopper 250 to enhance the exterior appearance of the electric bicycle 1. Particularly, as shown in FIGS. 4A to 4C, in an embodiment, the positioning decoration cover 270 is disposed along the extending direction (i.e. the longitudinal direction) of the upper tube 110 and has a positioning tube 272 extending downward. The positioning tube 272 has a tubular hole 270a configured as a channel to allow the battery 30 to pass through the positioning decoration cover 270. When the positioning decoration cover 270 is disposed on the upper tube 110, the positioning tube 272 preferably at least partially extends into the through hole 118 of the upper tube 110, and the tubular hole 270a communicates with the through hole 118 to function as a guiding channel for guiding the upward movement of the battery 30. In another embodiment, the length of the positioning tube 272 is so designed that the positioning tube 272 is inserted into the through hole 118 from the upper surface 114 of the upper tube 110 and extends to touch the upper edge of the restraining portion 214 of the bracket 210. The positioning tube 272 further has a first opening 272a and a second opening 272b corresponding to the protrusion portions 247a and 247b of the engaging member 247, respectively. When the locking device 240 is in the locked state, the protrusion portions 247a and 247b of the engaging member 247 respectively extend through the first opening 272a and the second opening 272b to interfere with battery 30 and the stopper 250. When the locking device 240 is in the unlocked state, the protrusion portions 247a and 247b of the engaging member 247 retract from the first opening 272a and the second opening 272b to release the interference with the battery 30 and the stopper 250. The upper decoration cover 280 is disposed one the stopper 250. When the locking device 240 interferes with the stopper 250, the upper decoration cover 280 preferably substantially shields the gap between the stopper 250 and the upper surface 114 of the upper tube 110, so the positioning decoration cover 270 and the upper decoration cover 280 have a substantial integrated appearance. When the stopper 250 rotates relative to the bracket 210 to unblock the up-down path P, the upper decoration cover 280 and the stopper 250 rotate together to reveal the tubular hole 270a.

The battery lift mechanism further includes a cushion 260. The cushion 260 is disposed on the bottom surface of the stopper 250. When the stopper 250 blocks the up-down path P, the cushion 260 is preferably pressed against the rear top end of the battery 30. The cushion 260 can be made of elastic materials, such as rubber, foaming materials, silicone. When the protrusion portion 247a presses against the front top end of the battery 30 and the stopper 250 blocks the up-down path P, the cushion 260 is compressed between the stopper 250 and the rear top end of the battery 30 and deforms to increase the mounting stability of the battery 30.

Figure 5A:
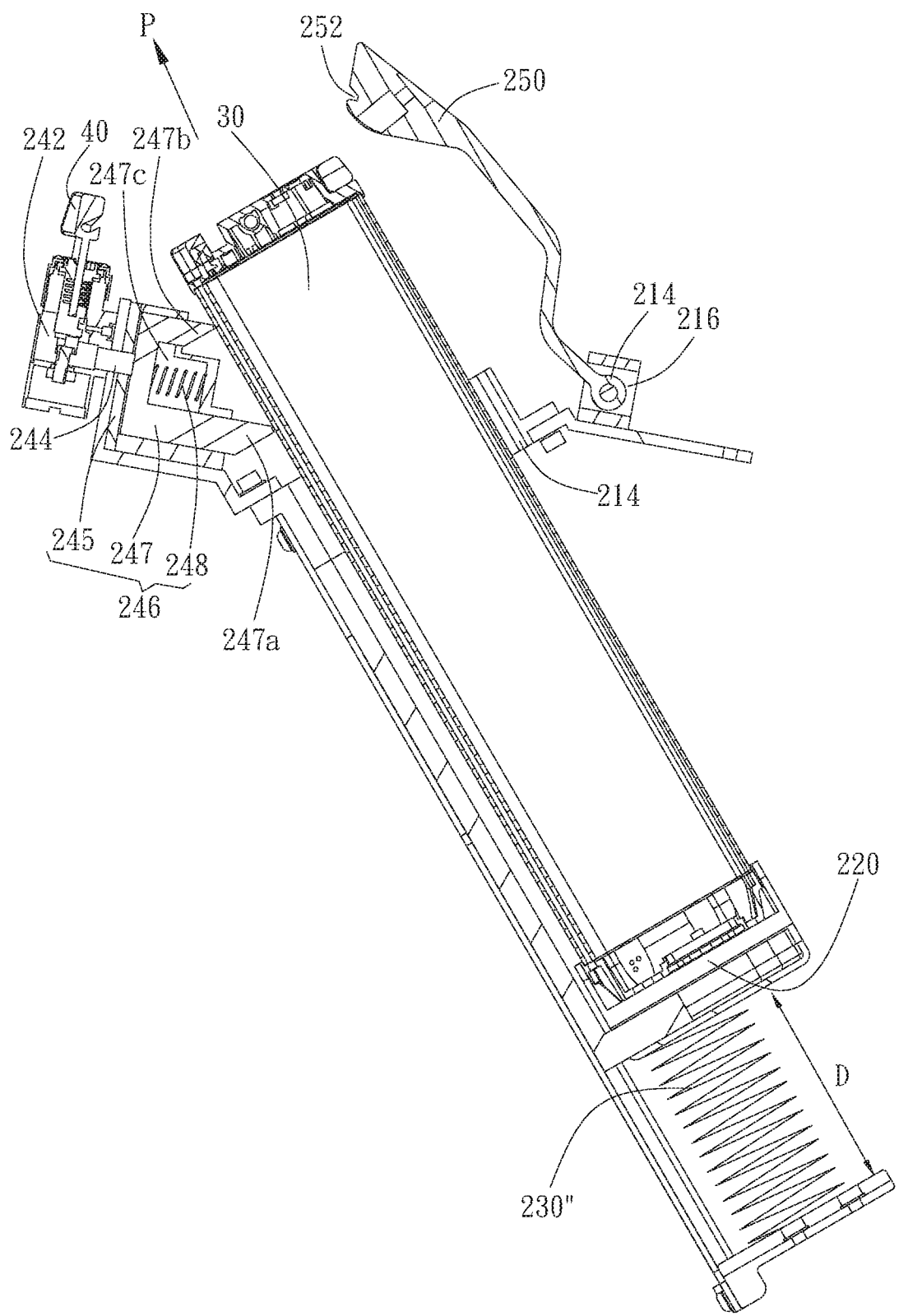
Figure 5B:
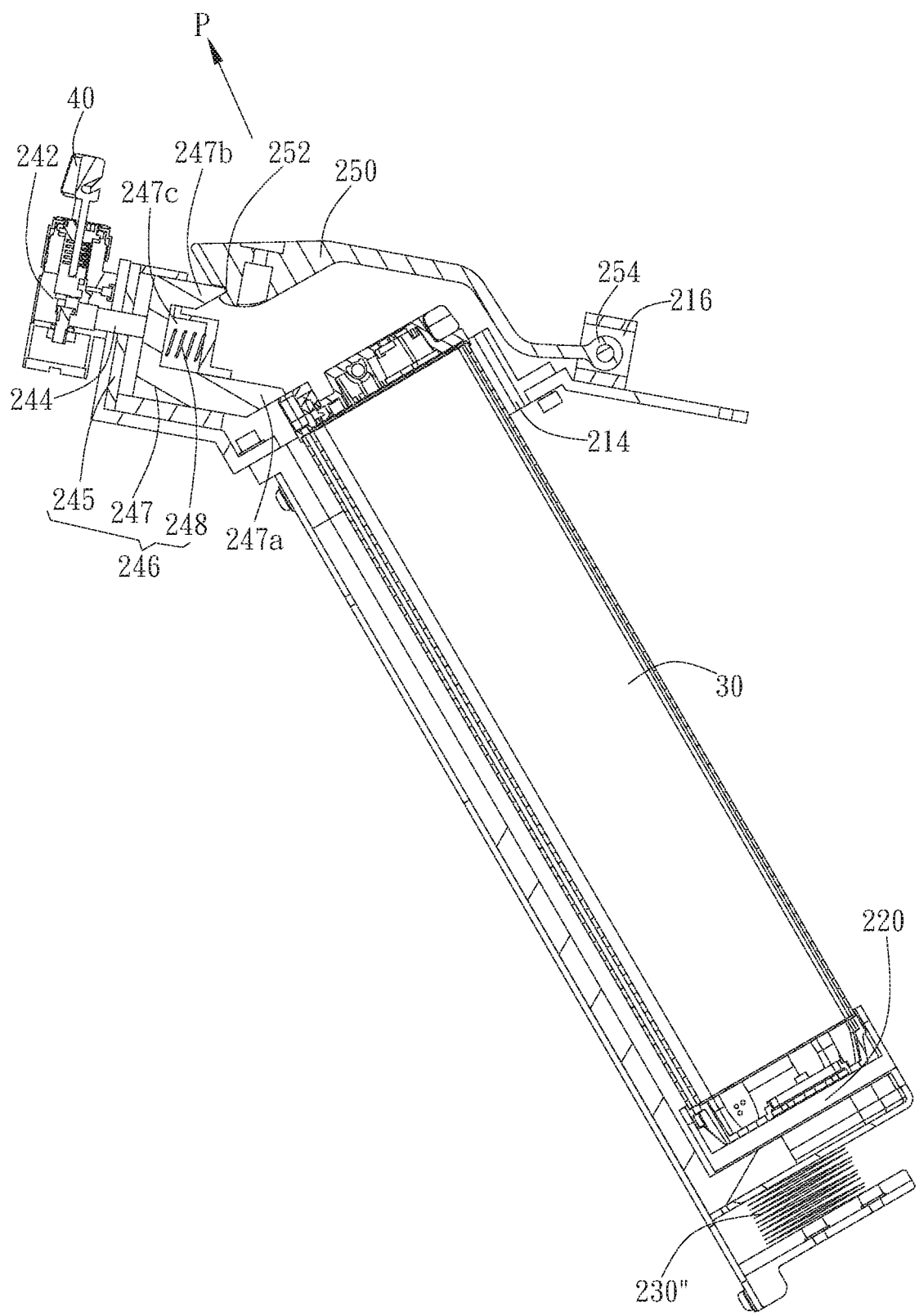

In the above embodiments, the upward-force device 230 is embodied as the gas spring, but not limited thereto. In other embodiments, any device capable of providing the upward-force to the carrier 220 can be used as the upward-force device 230. As shown in FIGS. 5A and 5B, the upward-force device 230" is embodied as an elastic unit, such as a spring. The elastic unit is disposed between the carrier 220 and the bracket 210. As shown in FIG. 5B, when the battery 30 is seated on the battery lift mechanism and the locking device 240 is in the locked state, the elastic unit is compressed. As shown in FIG. 5A, when the locking device 240 is in the unlocked state and the up-down path P is unblocked, the compressed elastic unit can provide an upward restoring force to drive the carrier 220 carrying the battery 30 to move upward along the up-down path P by the predetermined distance D, so the top end of the battery 30 protrudes from the upper surface 114 of the upper tube 110. As such, the battery 30 can be easily pulled out from the upper tube 110 without the need of maintaining enough space between the upper tube 110 and the lower tube 120 for the user accessing the battery 30, so the space of the frame can be effectively utilized for mounting a larger-sized battery.

From the above embodiments, a battery carrying device of the invention includes the carrier 220, the stopper 250, the lock body 242, and the engaging member 247. The carrier 220 is provided for carrying the battery 30, and the battery 30 is movable along an in-out path, such as the up-down path P, to be removed from the carrier 220. The stopper 250 selectively blocks or unblocks the in-out path. The lock body 242 is selectively in the unlocked state or in the locked state. The engaging member 247 is movable relative to the lock body 242 in response to the unlocked state or the locked state of the lock body 242. The engaging member 247 includes a first engaging portion, e.g. the first protrusion portion 247a, and a second engaging portion, e.g. the second protrusion portion 247b. The first engaging portion and the second engaging portion correspond to the battery 30 and the stopper 250, respectively. As shown in FIG. 2B, when the lock body 242 is in the locked state, the first engaging portion, e.g. the first protrusion portion 247a, interferes with the battery 30 to restrict the battery 30 to move along the in-out path such as the up-down path P, and the second engaging portion, e.g. the second protrusion portion 247b, interferes with the stopper 250, so that stopper 250 maintains blocking the in-out path. As shown in FIG. 2D, when the lock body 242 is in the unlocked state, the interference of the first engaging portion, e.g. the first protrusion portion 247a, with the battery 30 and the interference of the second engaging portion, e.g. the second protrusion portion 247b, with the stopper 250 are removed to allow the battery 30 to move along the in-out path such as the up-down path P, and the stopper 250 is allowed to rotate away from the in-out path with respect to the first pivot portion 216.

Moreover, as described above, the locking device 240 can further include the tongue 244 and the elastic unit 248. The tongue 244 moveably couples with the lock body 242 and extends or retracts in response to the locked state or the unlocked state of the lock body 242. When the lock body 242 is in the locked state, the tongue 244 extends out the lock body 242 in response to the locked state of the lock body 242 to push the engaging member 247 forward and compress the elastic unit 248, so the first engaging portion such as the first protrusion portion 247a and the second engaging portion such as the second protrusion portion 247b interfere with the battery 30 and the stopper 250, respectively. When the lock body 242 is in the unlocked state, the tongue 244 retracts into the lock body 242 to release the interference of the first engaging portion such as the first protrusion portion 247a with the battery 30 and the interference of the second engaging portion such as the second protrusion portion 247b with the stopper 250. In other words, when the locking device 240 is mounted on the frame 10, the lock body 242 is disposed on the front end of the upper tube 110, and the engaging member 247 moves relative to the lock body 242 in response the locked state or the unlocked state of the lock body 242 to approach or leave the through hole 118.

Figure 6A:
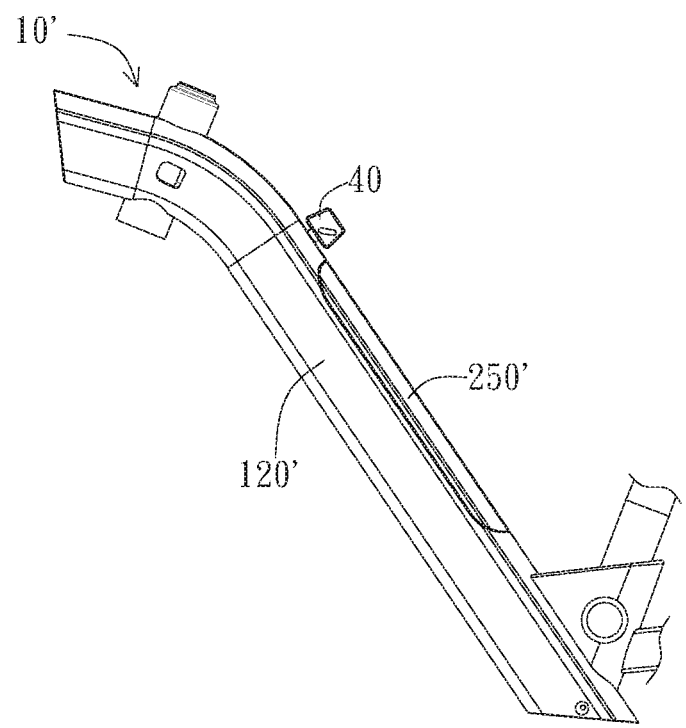
Figure 6B:
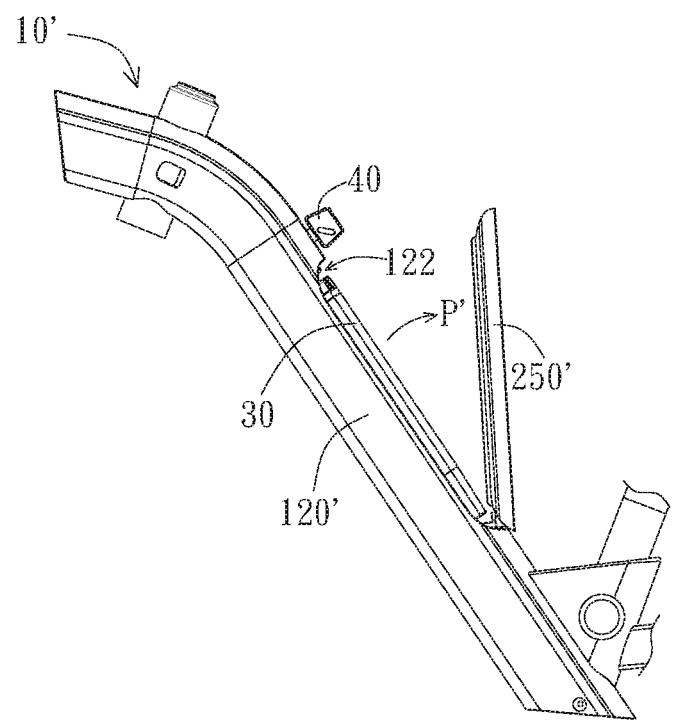
Figure 6C:
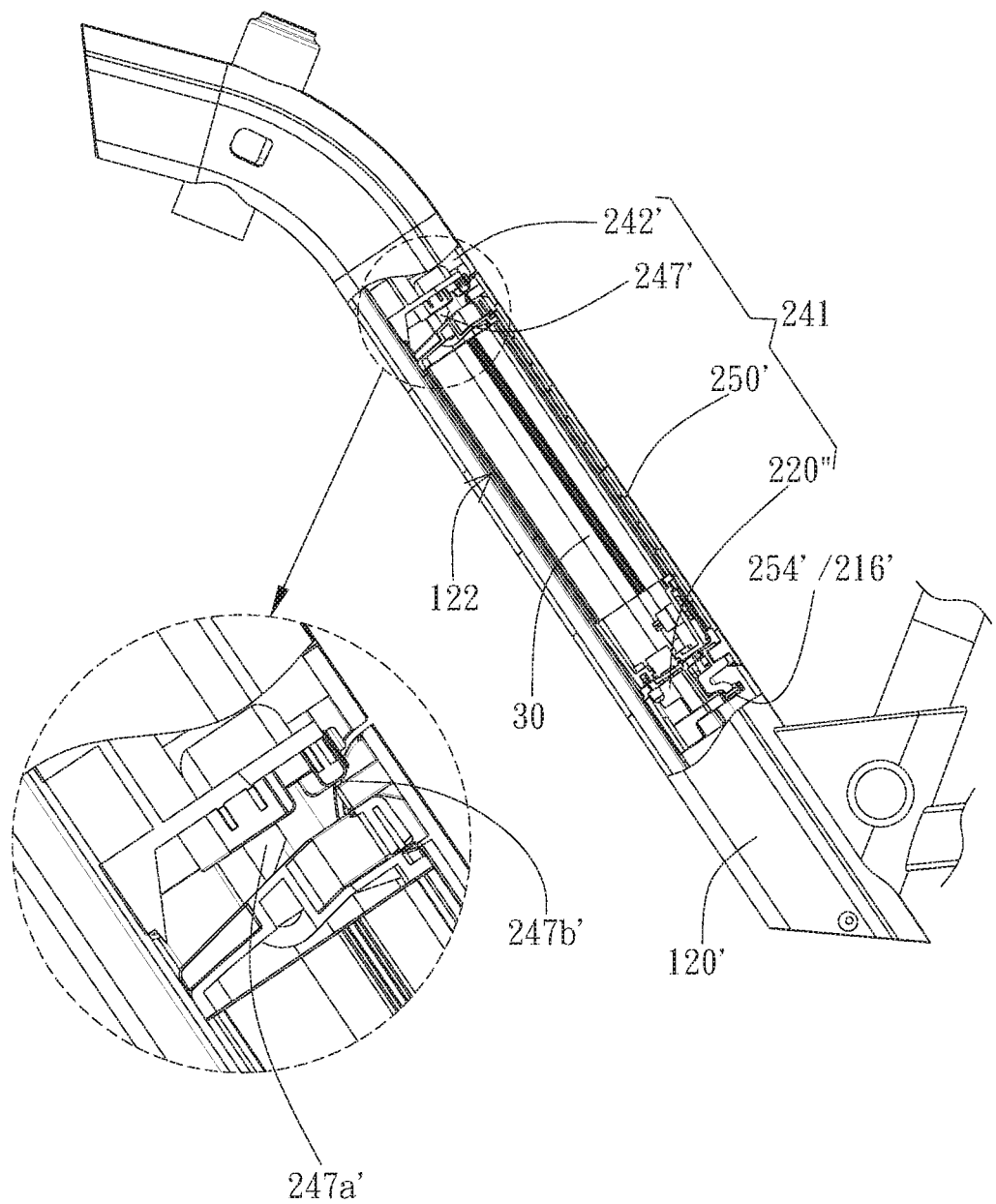

In the above embodiment, the lock body 242 is disposed on the upper tube 110, and the in-out path (i.e. the up-down path P) of the battery 30 is parallel to the extending direction of the lower tube 120, but not limited thereto. In another embodiment, as shown in FIGS. 6A to 6C, the battery carrying device 241 is mounted on the lower tube 120' of the frame 10', and the lower tube 120' has an accommodation trough 122. The carrier 220" of the battery carrying device 241 is disposed in the accommodation trough 122 for carrying the battery 30. In this embodiment, the accommodation trough 122 is disposed along the extending direction of the lower tube 120', so the opening of the accommodation trough 122 is opened along the extending direction of the lower tube 120' and the in-out path P' of the battery 30 and the extending direction of the lower tube 120' has an included angle. For example, the in-out path P' of the battery 30 can be (1) a path substantially parallel to the radial direction of the lower tube 120' or (2) a path that the top end of the battery 30 rotates toward the rear upward direction of the lower tube 120' with the lower end of the battery as the rotation axis. Moreover, in the above embodiment, the engaging member 247 has the protrusion portions 247a, 247b as the engaging portions to respectively interfere with the battery 30 and the stopper 250, and the elastic unit 248 provides the restoring force to release the interference, but not limited thereto.

In this embodiment, the battery carrying device 241 includes the carrier 220", a stopper 250', a lock body 242', and an engaging member 247'. The lock body 242' is disposed on the lower tube 120', and the lock body 242' is selectively in a locked state or an unlocked state. The carrier 220" is preferably disposed on the lower end of the accommodation trough 122. When the battery 30 that is carried by the carrier 220" is accommodated in the accommodation trough 122, i.e. the battery 30 is mounted on the electric bicycle, the longitudinal axis of the battery 30 is preferably parallel to the extending direction of the lower tube 120'. The engaging member 247' is disposed corresponding to the carrier 220" on the upper end of the accommodation trough 122, and the engaging member 247' is movably relative to the lock body 242' in response to the locked state or the unlocked state of the locked body 242' to selectively interfere with the battery 30 and the stopper 250'. In other words, in response to the locked state or the unlocked state of the lock body 242', the engaging member 247' can selectively approach the carrier 220" or move away from the carrier 220" with respect to the lock body 242', so as to interfere with the battery 30 and the stopper 250 or to release the interference with the battery 30 and the stopper 250. The stopper 250' is preferably embodied as a cover. The stopper 250' is preferably movably disposed on the lower tube 120' to selectively block or unblock the in-out path P'. Particularly, the stopper 250' is rotatable relative to the surface of the tower tube 120' to selectively shield the opening of the accommodation trough 122 to block the in-out path P'. For example, the lower tube 120' has a first pivot portion 216' disposed opposite to the lock body 242' and corresponding to the carrier 220", and the stopper 250' has a second pivot portion 254'. The first pivot portion 216' and the second pivot portion 254' form a pivot, so the stopper 250' can rotate relative to the lower tube 120' to selectively block or unblock the in-out path P'. That is, when the stopper 250' rotate relative to the lower tube 120', the stopper 250' rotates away from or close to the lock body 242'. As shown in FIG. 6A, when the lock body 242' is in the locked state, the cover (i.e. the stopper 250') substantially covers the opening of the accommodation trough 122, so the frame 10' has an integral outer appearance and the in-out path P' of the battery 30 is blocked. As shown in FIG. 6B, when the lock body 242' is in the unlocked state, the cover (i.e. the stopper 250') is rotatable relative to the lower tube 120' to allow the battery 30 to move in and out of the carrier 220".

Figure 7A:
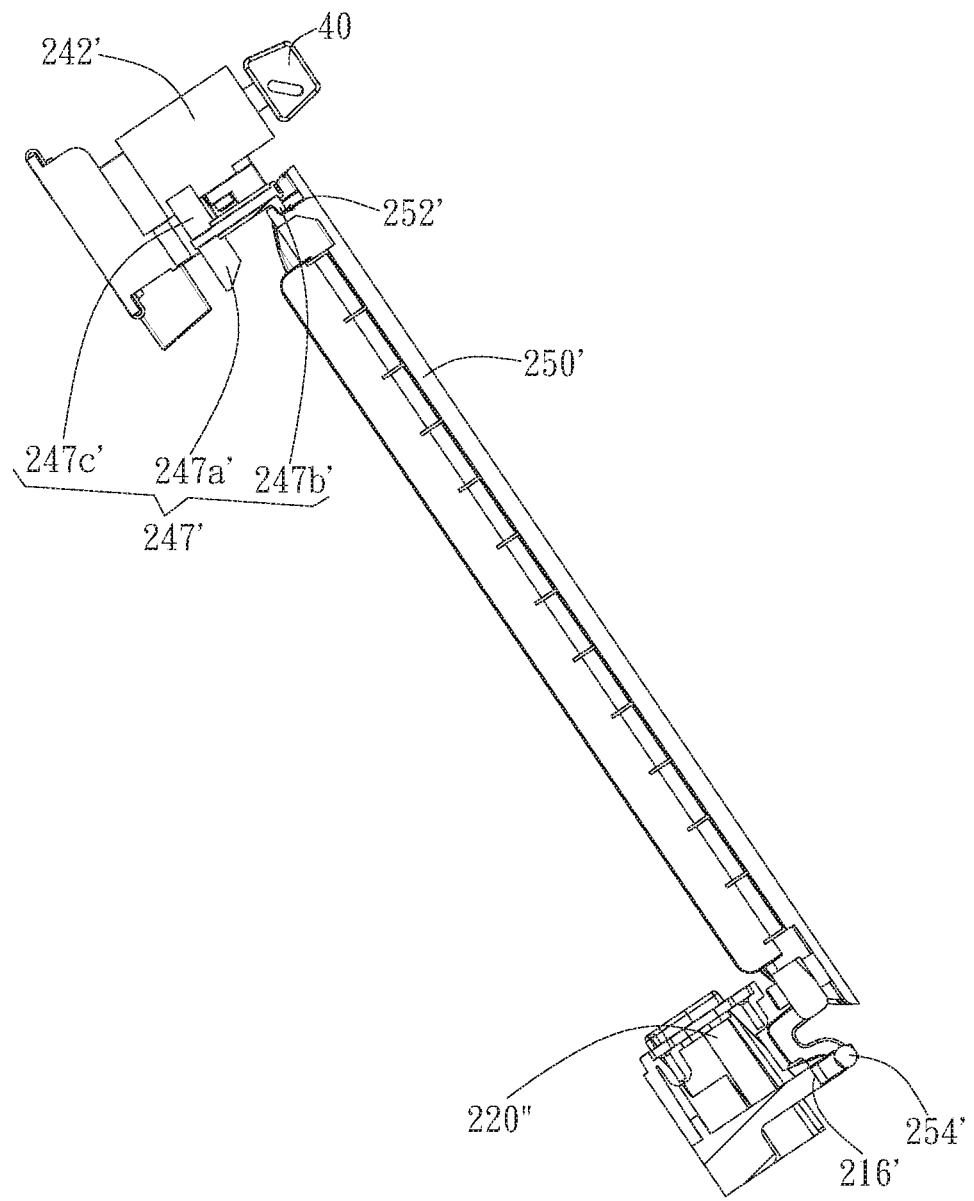
FIG. 7A is a schematic view of FIG. 6A to show the lock body of the battery carrying device in the locked state.
Figure 8A:
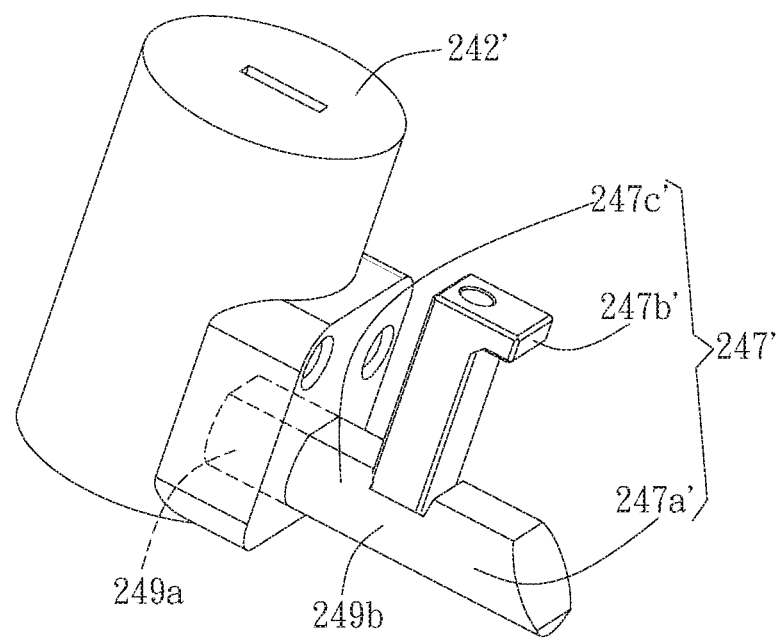
FIGS. 8A and 8B are respectively a perspective view and a schematic side view of the lock body and the engaging member in an embodiment of the invention.
Figure 8B:
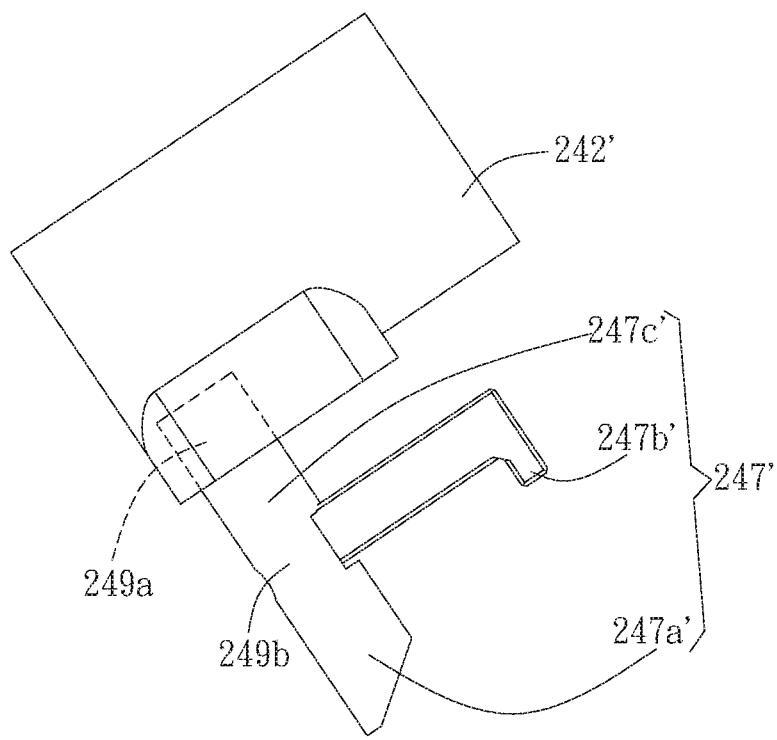

As shown in FIGS. 6C and 7A, the engaging member 247' has a first engaging portion 247a' and a second engaging portion 247b' corresponding to the battery 30 and the stopper 250', respectively. In this embodiment, the engaging member 247' is embodied as an integral moving mechanism with the lock body 242', so the engaging member 247' can extend out or retract into the lock body 242' in response to the locked state or the unlocked state of the lock body 242'. For example, as shown in FIGS. 8A and 8B, one end of the engaging member 247' is embodied as a coupling portion 247c'. One end of the coupling portion 247c' (i.e. the coupling end 249a) couples with the lock body 242', so the engaging member 247' moves in response to the locked state or the unlocked state of the lock body 242'. The other end of the coupling portion 247c' (i.e. the connection end 249b) is connected to the first engaging portion 247a' and the second engaging portion 247b'. In this embodiment, the coupling portion 247c' can be embodied as a post or column extending along the extending direction of the lower tube 120', so the left end of the coupling portion 247c' is the coupling end 249a, and the right end of the coupling portion 247c' is the first engaging portion 247a' while the second engaging portion 247b' has a reversed L shape which couples the middle portion of the coupling portion 247c'. In another aspect, the coupling portion 247c' is embodied as a T-shaped or L-shaped portion, so the coupling end 249a of the coupling portion 247c' couples with the lock body 242', and the first engaging portion 247a' and the second engaging portion 247b' embodied as two protrusion portions extending opposite to the lock body 242' from two sides of the connection end 249b of the coupling portion 247c'. In other words, the coupling end of the coupling portion 247c' preferably extends parallel to the extending direction of the lower tube 120', and the connection end of the coupling portion 247c' preferably extends parallel to the radial direction of the lower tube 120'. As such, the extending direction of the first engaging portion 247a' and the second engaging portion 247b' are substantially parallel to the extending direction of the lower tube 120', and the first engaging portion 247a' and the second engaging portion 247b are disposed along the in-out path P' of the battery 30. That is, first engaging portion 247a' and the second engaging portion 247b are disposed along the radial direction of the lower tube 120', so the first engaging portion 247a' is closer to the bottom of the accommodation trough 122 (i.e. further away from the opening of the accommodation trough 122), and the second engaging portion 247b is closer to the opening of the accommodation trough 122. The extending length of the first engaging portion 247a' is preferably larger than that of the second engaging portion 247b'.

In this embodiment, the lock body 242' can be a key lock. As shown in FIGS. 6C and 7A, when the key 40 rotates the lock core to enable the lock body 242' to be in the locked state, the rotation of the lock core drives the engaging member 247' to extend out the lock body 242' to move toward the carrier 220", and the extending length of the engaging member 247' in the accommodation trough 122 is increased. As such, the first engaging portion 247a' and the second engaging portion 247b interfere with the battery 30 and the stopper 50', respectively. For example, the first engaging portion 247a' presses against the top end of the battery 3, while the second engaging portion 247b is inserted into the recess 252' of the stopper 250' to restrict the rotation of the stopper 250' relative to the lower tube 120' and the movement of the battery 30 along the in-out path P'. Therefore, the battery 30 can be stably confined between the carrier 220" and the engaging member 247', i.e. mounted on the lower tube 120'.

Figure 7B:
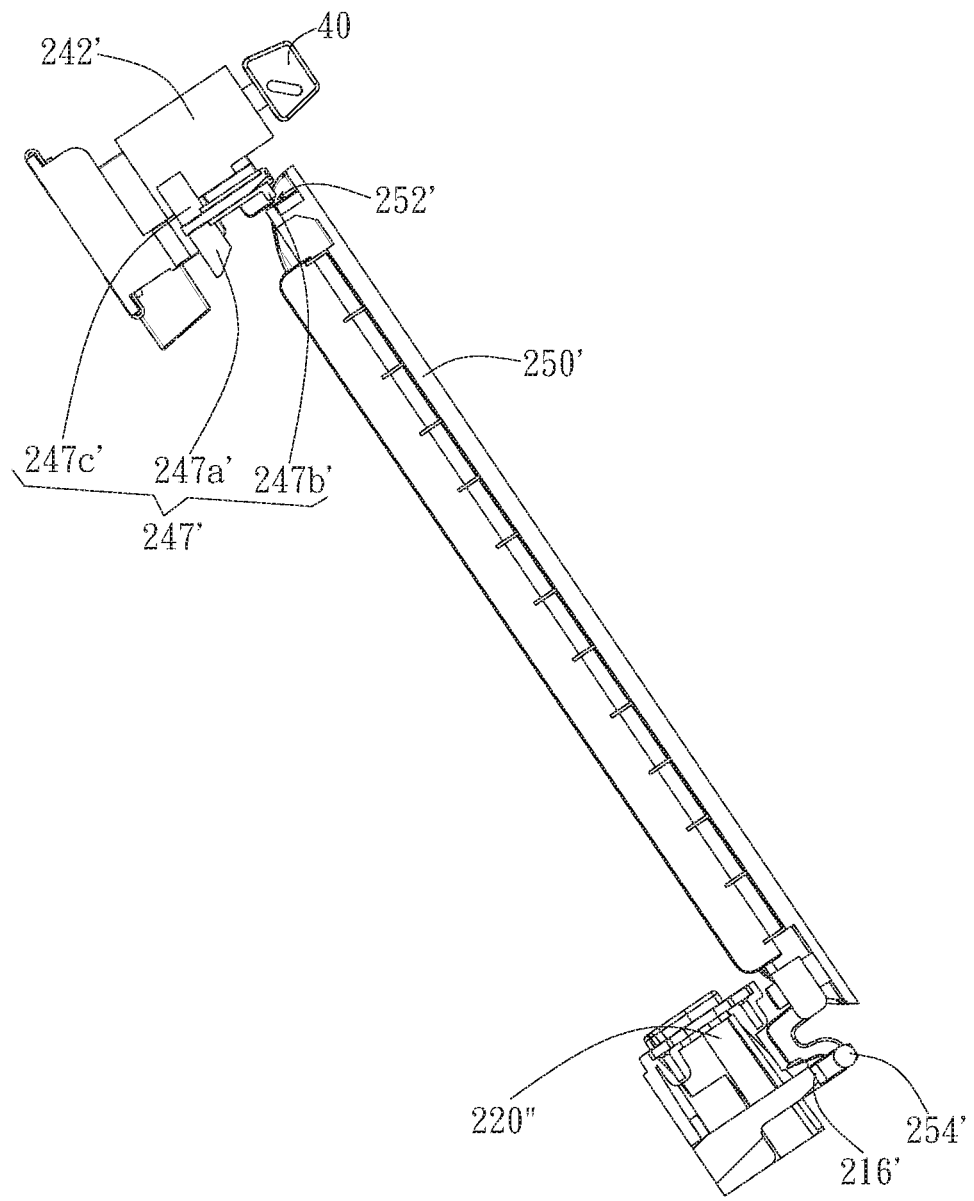
FIG. 7B is a schematic view of FIG. 6A to show the lock body of the battery carrying device in the unlocked state.
Figure 7C:
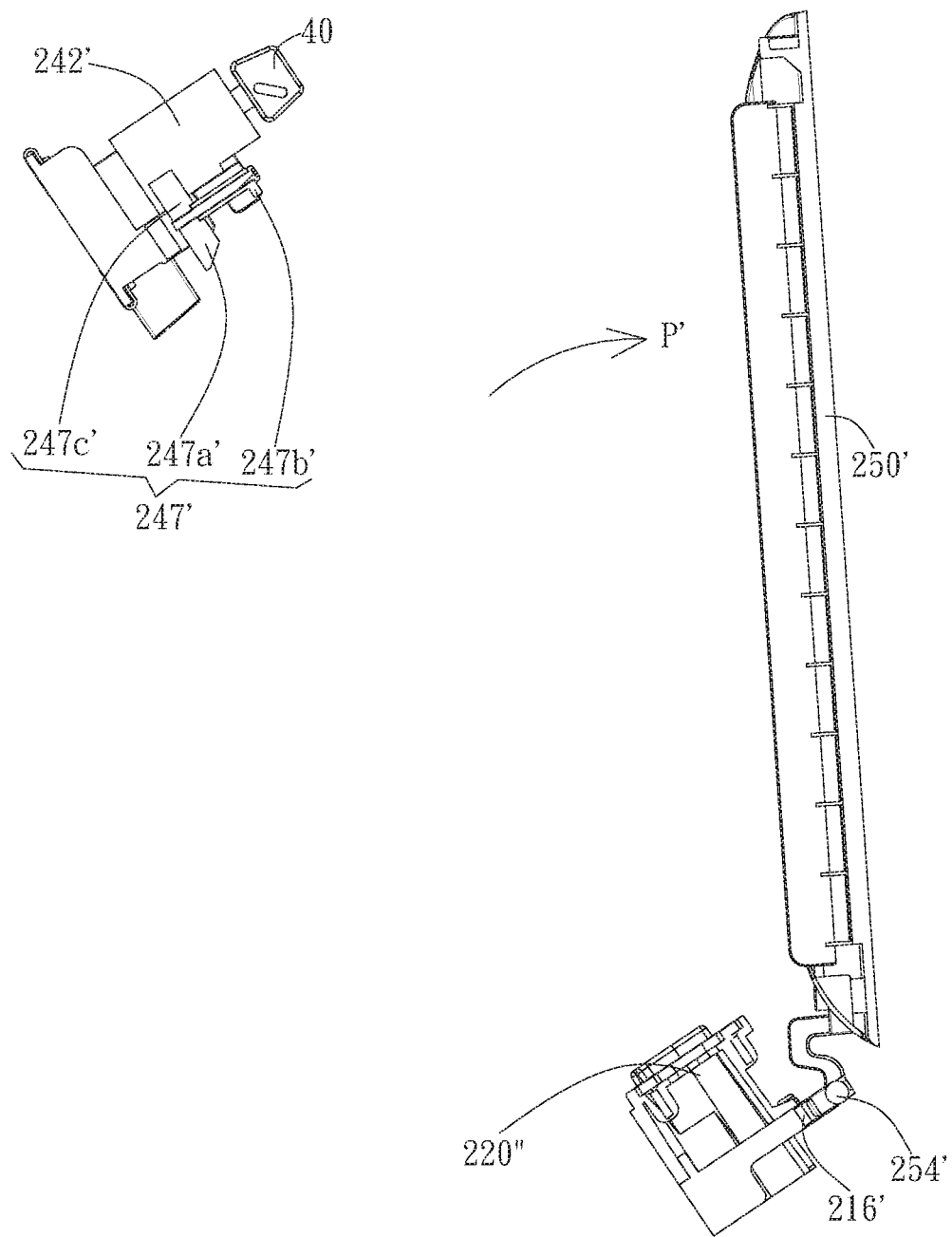
FIG. 7C is a schematic view of FIG. 6B to show that the stopper of the battery carrying device rotates relative to the frame.

As shown in FIG. 7B, when the key 40 reversely rotates the lock core to enable the lock body 242' to be in the unlocked state, the rotation of the lock core drives the engaging member 247' to retract into the lock body 242' to move away from the carrier 220", and the extending length of the engaging member 247' in the accommodation trough 122 is decreased (i.e. the engaging member 247' moves away from the battery 30 and the stopper 250'). As such, the interference of the first engaging portion 247a' with the battery 30 and the interference of the second engaging portion 247b with the stopper 50' are removed. For example, the first engaging portion 247a' moves away from the top end of the battery 30, while the second engaging portion 247b escapes from the recess 252' of the stopper 250'. Therefore, as shown in FIGS. 6B and 7C, the stopper 250' is rotatable relative to the lower tube 120' to allow the battery 30 to move in and out of the carrier 220". That is, the stopper 250' can unblock the in-out path P' and expose the battery 30, so the user can replace the battery 30.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. An electric bicycle frame, comprising:
    a lower tube with an accommodation portion into which a battery is inserted, wherein the accommodation portion is adapted to receive the battery; and
    an upper tube transversely extending with respect to the lower tube, the upper tube having a front end, a rear end opposite to the front end, and a through hole communicating with the accommodation portion;
    wherein:
    the through hole for inserting the battery into the accommodation portion is formed through the upper tube;
    the upper tube incorporates a seat tube at the rear end and incorporates an assembly comprising a stem and a handle bar at the front end; and
    a longitudinal axis of the lower tube is disposed to make a lower end of the lower tube be positioned in front of a rear wheel and to allow insertion of the battery into and removal of the battery from the accommodation portion without interference with the handle bar.

2. The electric bicycle frame of claim 1, further comprising a stopper movably disposed neighboring the through hole to selectively at least partially shield the through hole of the upper tube.

3. The electric bicycle frame of claim 2, further comprising a cushion disposed on the stopper, wherein when the stopper shields the through hole, the cushion is pressed against the battery.

4. The electric bicycle frame of claim 1, further comprising a locking device disposed on the upper tube, wherein the locking device is selectively in an unlocked state or a locked state; when the locking device is in the locked state, the locking device interferes with the battery to limit a movement of the battery relative to the accommodation portion; when the locking device is in the unlocked state, the interference between the locking device and the battery is removed to allow the battery to move relative to the accommodation portion.

5. The electric bicycle frame of claim 4, wherein the locking device comprises a lock body, a tongue, and an interfering unit; the tongue is capable of extending out or retracting into the lock body in response to the locked state or the unlocked state of the lock body; when the lock body is in the locked state, the tongue extends outward to push the interfering unit forward to interfere with the battery; when the lock body is in the unlocked state, the tongue retracts into the lock body to release the interference of the interfering unit with the battery.

6. The electric bicycle frame of claim 4, further comprising a stopper movably disposed neighboring the through hole to selectively at least partially shield the through hole of the upper tube, wherein when the stopper shields the through hole, and the locking device is in the locked state, the locking device further interferes with the stopper to limit a movement of the stopper relative to the upper tube.

7. The electric bicycle frame of claim 1, further comprising an upward-force device mounted on the lower tube, wherein the upward-force device provides an upward force to move the battery upward relative to the lower tube.

8. The electric bicycle frame of claim 7, wherein the upward-force device is a gas spring comprising a cylinder and a rod; the rod is capable of extending relative to the cylinder due to pressure activation of the cylinder to move the battery upward.

9. The electric bicycle frame of claim 7, wherein the upward-force device is an elastic unit disposed in the accommodation portion under the battery.

10. The electric bicycle frame of claim 1, wherein the battery has a cross section perpendicular to a longitudinal axis of the battery; the cross section is smaller than the through hole in size.

11. The electric bicycle frame of claim 1, wherein the lower tube extends downward and backward to be connected to a lower end of the seat tube 132.

12. An electric bicycle frame, comprising:
    a lower tube with an accommodation portion into which a battery is inserted, wherein the accommodation portion is adapted to receive the battery; and
    an upper tube transversely extending with respect to the lower tube, the upper tube having a front end, a rear end opposite to the front end, and a through hole communicating with the accommodation portion;
    wherein:
    the through hole for inserting the battery into the accommodation portion is formed through the upper tube;
    the upper tube incorporates a seat tube at the rear end and incorporates an assembly comprising a stem and a handle bar at the front end; and
    a longitudinal axis of the lower tube is disposed to allow insertion of the battery into and removal of the battery from the accommodation portion without interference with the handle bar, so that the battery passes the through hole at a predetermined angle larger than 90 degrees with respect to the rear end of the upper tube.

13. The electric bicycle frame of claim 12, wherein a lower end of the battery is accommodated toward a motor.

14. The electric bicycle frame of claim 12, wherein a lower end of the battery is accommodated near an assembly comprising a pedal.

15. The electric bicycle frame of claim 12, wherein a lower end of the battery is accommodated near a position ahead of a rear wheel.

16. The electric bicycle frame of claim 12, wherein the through hole is positioned proximate to the handle bar rather than the seat tube.

17. The electric bicycle frame of claim 12, wherein an upper end of the battery is accommodated near the handle bar rather than the seat tube.

* * * * *